United States Patent
Robotham et al.

(10) Patent No.: US 11,783,333 B2
(45) Date of Patent: *Oct. 10, 2023

(54) INTELLIGENT ASSERTION TOKENS FOR AUTHENTICATING AND CONTROLLING NETWORK COMMUNICATIONS USING A DISTRIBUTED LEDGER

(71) Applicant: EYGS LLP, London (GB)

(72) Inventors: John Stoddard Robotham, Belmont, MA (US); Barath Krishna Balasubramanian, Cambridge, MA (US); Franciscus Cornelis Pieter Putman, Jc Odijk (NL); Todd R. Smith, Newport Beach, CA (US); Steven John Valeri, Boston, MA (US)

(73) Assignee: EYGS LLP, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,329

(22) Filed: Jan. 17, 2023

(65) Prior Publication Data

US 2023/0153812 A1 May 18, 2023

Related U.S. Application Data

(63) Continuation of application No. 17/231,467, filed on Apr. 15, 2021, now Pat. No. 11,574,308.

(Continued)

(51) Int. Cl.
*G06Q 20/40* (2012.01)
*G06Q 10/083* (2023.01)
*G06Q 20/38* (2012.01)

(52) U.S. Cl.
CPC ........ *G06Q 20/401* (2013.01); *G06Q 10/083* (2013.01); *G06Q 20/38215* (2013.01); *G06Q 2220/00* (2013.01)

(58) Field of Classification Search
CPC ............... G06Q 10/083; G06Q 20/401; G06Q 20/38212; G06Q 2220/00
(Continued)

(56) References Cited

U.S. PATENT DOCUMENTS

| | | |
|---|---|---|
| 5,892,900 A | 4/1999 | Ginter et al. |
| 7,574,383 B1 | 8/2009 | Parasnis et al. |

(Continued)

FOREIGN PATENT DOCUMENTS

| | | |
|---|---|---|
| CN | 107274184 A | 10/2017 |
| CN | 110033377 A | 7/2019 |

(Continued)

OTHER PUBLICATIONS

"Betti et al., Smart Contracts Enabled Simulation for Hyperconnected Logistics, Feb. 2020. pp. 1-45," (Year: 2020).*

(Continued)

*Primary Examiner* — Courtney P Jones
(74) *Attorney, Agent, or Firm* — COOLEY LLP

(57) ABSTRACT

A method includes generating, via a processor, a bill of materials (BOM) representation associated with a BOM indicating at least one good and including a representation of a plurality of dependencies to qualify the at least one good for at least one of a regulatory claim, a duty benefit claim or an admissibility claim. A smart contract code for a compliance declaration smart contrast that references the BOM representation is transmitted via the processor and to a distributed ledger. A representation of the plurality of assertion token is received, via the processor, from a plurality of remote compute devices, and in response to deploying the compliance declaration smart contract. A compliance declaration token is minted, via the processor, in response to receiving the representation of a plurality of assertion tokens and based on the compliance declaration smart contract.

26 Claims, 27 Drawing Sheets

Related U.S. Application Data

(60) Provisional application No. 63/010,598, filed on Apr. 15, 2020.

(58) Field of Classification Search
USPC .......................................................... 705/67
See application file for complete search history.

(56) References Cited

U.S. PATENT DOCUMENTS

| | | | |
|---|---|---|---|
| 9,397,985 | B1 | 7/2016 | Seger, II et al. |
| 9,608,829 | B2 | 3/2017 | Spanos et al. |
| 9,785,369 | B1 | 10/2017 | Ateniese et al. |
| 9,794,074 | B2 | 10/2017 | Toll et al. |
| 9,870,508 | B1 | 1/2018 | Hodgson et al. |
| 9,881,176 | B2 | 1/2018 | Goldfarb et al. |
| 9,906,513 | B2 | 2/2018 | Wuehler |
| 9,942,231 | B1 | 4/2018 | Laucius et al. |
| 9,948,467 | B2 | 4/2018 | King |
| 9,959,065 | B2 | 5/2018 | Ateniese et al. |
| 10,026,118 | B2 | 7/2018 | Castinado et al. |
| 10,298,395 | B1 | 5/2019 | Schiatti et al. |
| 10,438,290 | B1 | 10/2019 | Winklevoss et al. |
| 10,505,726 | B1 | 12/2019 | Andon et al. |
| 10,521,780 | B1 | 12/2019 | Hopkins, III et al. |
| 10,540,654 | B1 | 1/2020 | James et al. |
| 10,721,069 | B2 | 7/2020 | Konda et al. |
| 11,206,138 | B2 | 12/2021 | Canterbury et al. |
| 11,232,439 | B2 | 1/2022 | Westland |
| 11,316,691 | B2 | 4/2022 | Westland |
| 11,348,099 | B2 | 5/2022 | Vijayan |
| 11,481,841 | B2 | 10/2022 | Robotham |
| 11,528,141 | B2 | 12/2022 | Konda et al. |
| 2002/0143598 | A1 | 10/2002 | Scheer |
| 2005/0177435 | A1 | 8/2005 | Lidow |
| 2008/0313241 | A1 | 12/2008 | Li et al. |
| 2009/0204517 | A1 | 8/2009 | Edens et al. |
| 2012/0108446 | A1 | 5/2012 | Wu et al. |
| 2014/0109245 | A1 | 4/2014 | Pestell |
| 2014/0358745 | A1 | 12/2014 | Lunan |
| 2015/0018406 | A1 | 1/2015 | Glimcher et al. |
| 2016/0260169 | A1 | 9/2016 | Arnold et al. |
| 2016/0358165 | A1 | 12/2016 | Maxwell |
| 2017/0091750 | A1 | 3/2017 | Maim |
| 2017/0278100 | A1 | 9/2017 | Kraemer et al. |
| 2017/0293503 | A1 | 10/2017 | Curtis |
| 2017/0301047 | A1 | 10/2017 | Brown et al. |
| 2017/0316162 | A1 | 11/2017 | Wall Warner et al. |
| 2017/0346639 | A1 | 11/2017 | Muftic |
| 2018/0005186 | A1 | 1/2018 | Hunn |
| 2018/0048461 | A1 | 2/2018 | Jutla et al. |
| 2018/0082043 | A1 | 3/2018 | Witchey et al. |
| 2018/0101701 | A1 | 4/2018 | Barinov et al. |
| 2018/0139043 | A1 | 5/2018 | Jayachandran et al. |
| 2018/0165131 | A1 | 6/2018 | O'Hare et al. |
| 2018/0173378 | A1 | 6/2018 | Tinari et al. |
| 2018/0174097 | A1 | 6/2018 | Liu et al. |
| 2018/0189753 | A1 | 7/2018 | Konda et al. |
| 2018/0218176 | A1 | 8/2018 | Voorhees et al. |
| 2018/0218469 | A1 | 8/2018 | Lert, Jr. et al. |
| 2018/0237863 | A1 | 8/2018 | Namsaraev et al. |
| 2018/0331832 | A1 | 11/2018 | Pulsifer |
| 2019/0007381 | A1 | 1/2019 | Isaacson et al. |
| 2019/0012662 | A1 | 1/2019 | Krellenstein et al. |
| 2019/0034923 | A1 | 1/2019 | Greco et al. |
| 2019/0080407 | A1 | 3/2019 | Molinari et al. |
| 2019/0108482 | A1 | 4/2019 | Vikas et al. |
| 2019/0130701 | A1 | 5/2019 | Simons |
| 2019/0164151 | A1 | 5/2019 | Doney et al. |
| 2019/0164153 | A1 | 5/2019 | Agrawal et al. |
| 2019/0164223 | A1 | 5/2019 | De Jong |
| 2019/0266577 | A1 | 8/2019 | Baldet et al. |
| 2019/0279204 | A1 | 9/2019 | Norton et al. |
| 2019/0299105 | A1 | 10/2019 | Knight et al. |
| 2019/0312869 | A1 | 10/2019 | Han et al. |
| 2019/0319798 | A1 | 10/2019 | Chalkias |
| 2019/0340269 | A1 | 11/2019 | Biernat et al. |
| 2019/0340619 | A1 | 11/2019 | Leong et al. |
| 2019/0385120 | A1 | 12/2019 | Yund et al. |
| 2019/0385156 | A1 | 12/2019 | Liu |
| 2020/0034788 | A1 | 1/2020 | Ynion, Jr. |
| 2020/0034834 | A1 | 1/2020 | Li et al. |
| 2020/0042913 | A1 | 2/2020 | Kumar et al. |
| 2020/0051043 | A1 | 2/2020 | Wilson et al. |
| 2020/0059361 | A1 | 2/2020 | Konda et al. |
| 2020/0059362 | A1 | 2/2020 | Brody et al. |
| 2020/0059364 | A1 | 2/2020 | Konda et al. |
| 2020/0065380 | A1 | 2/2020 | Kartoun et al. |
| 2020/0065761 | A1 | 2/2020 | Tatchell |
| 2020/0082336 | A1 | 3/2020 | Vuppala et al. |
| 2020/0111068 | A1* | 4/2020 | Scarselli ............ G06Q 20/409 |
| 2020/0174990 | A1 | 6/2020 | Pratkanis |
| 2020/0175465 | A1 | 6/2020 | Abuhab |
| 2020/0226741 | A1 | 7/2020 | Correia Villa Real et al. |
| 2020/0235943 | A1 | 7/2020 | Salimi et al. |
| 2020/0294128 | A1 | 9/2020 | Cella |
| 2020/0320529 | A1 | 10/2020 | Lyadvinsky et al. |
| 2020/0322154 | A1 | 10/2020 | Konda et al. |
| 2020/0327473 | A1 | 10/2020 | Zur et al. |
| 2020/0328893 | A1 | 10/2020 | Westland |
| 2020/0351093 | A1 | 11/2020 | Madhuram et al. |
| 2020/0351094 | A1 | 11/2020 | Canterbury et al. |
| 2020/0410439 | A1* | 12/2020 | Blackburn ........... G06Q 20/065 |
| 2021/0004739 | A1* | 1/2021 | Gill ....................... G06Q 50/26 |
| 2021/0042746 | A1 | 2/2021 | Westland |
| 2021/0150626 | A1 | 5/2021 | Robotham |
| 2021/0157947 | A1 | 5/2021 | Biazetti et al. |
| 2021/0203488 | A1 | 7/2021 | Stahl |
| 2021/0264444 | A1 | 8/2021 | Chen et al. |
| 2021/0326872 | A1 | 10/2021 | Robotham et al. |
| 2022/0108310 | A1 | 4/2022 | Westland |
| 2022/0188810 | A1 | 6/2022 | Doney |
| 2022/0197894 | A1 | 6/2022 | Brody et al. |
| 2022/0271915 | A1 | 8/2022 | Turner et al. |

FOREIGN PATENT DOCUMENTS

| | | |
|---|---|---|
| JP | 2020140400 A | 9/2020 |
| JP | 2020201564 A | 12/2020 |
| WO | WO-2017187395 A1 | 11/2017 |
| WO | WO-2017198891 A1 | 11/2017 |
| WO | WO-2018007828 A2 | 1/2018 |
| WO | WO-2018028777 A1 | 2/2018 |
| WO | WO-2018144302 A1 | 8/2018 |
| WO | WO-2018150275 A2 | 8/2018 |
| WO | WO-2018163044 A1 | 9/2018 |
| WO | WO-2018209153 A1 | 11/2018 |
| WO | WO-2020263607 A1 | 12/2020 |
| WO | WO-2021034603 A1 | 2/2021 |
| WO | WO-2021061044 A1 | 4/2021 |

OTHER PUBLICATIONS

Andreev, O., "Hidden in Plain Sight: Transacting Privately on a Blockchain. Introducing Confidential Assets in the Chain Protocol," [Online], Retrieved from the Internet: URL: https://blog.chain.com/hidden-in-plain-sight-transacting-privately-on-a-blockchain-835ab7...], Retrieved on Aug. 27, 2018, 11 pages.

Ben-Sasson, E. et al., "Scalable, transparent, and post-quantum secure computational integrity," Cryptology ePrint Archive, Report 2018/046 (2018), 83 pages.

"Composable NFTs," FLR Finance, 2023, 4 pages, https://flrfinance.medium.com/composable-nfts-db81238bfe52.

Composable Token _ Alexandria (Year: 2023), 3 pages.

Elmasri, R. et al., "Fundamentals of database systems," Seventh Edition, Pearson, 2016, 1273 pages.

Entriken, W. et al., "EIP-721: Non-Fungible Token Standard," Ethereum Improvement Proposals, Jan. 24, 2018, 14 pages.

ERC-20 Token Standard, 2020, 6 pages.

European Commission, "Code of Conduct on Withholding Tax," [Online], Ref. Ares(2017)5654449—Nov. 20, 2017, Retrieved from the Internet: https://ec.europa.eu/taxation_customs/sites/taxation/files/code_of_conduct_on_witholding_tax.pdf, 12 pages.

(56) References Cited

OTHER PUBLICATIONS

European Commission, "Non-paper on the withholding tax for discussion at the Expert Group on barriers to free movement of capital," Sep. 28, 2016, https://ec.europa.eu/transparency/regexpert/index.cfm?do=groupDetail.groupDetailDoc&id=28783&no=6 (last accessed Mar. 17, 2021), 6 pages.

European Parliament, Press Release, "Cum-ex tax fraud scandal: MEPs call for inquiry, justice, and stronger tax authorities," [Online], Nov. 29, 2018, Retrieved from the Internet: https://www.europarl.europa.eu/news/en/press-room/20181120IPR19552/cum-ex-tax-fraud-meps-call-for-inquiry-justice-and-stronger-tax-authorities, 4 pages.

European Parliament Resolution of Nov. 29, 2018 on the cum-ex scandal: financial crime and loopholes in the current legal framework (2018/2900(RSP), [Online], Retrieved from the Internet: http://www.europarl.europa.eu/doceo/document/TA-8-2018-0475_EN.html, May 19, 2020, 3 pages.

EY Global, "Transforming the business lifecycle with Nightfall," YouTube, Oct. 24, 2019, 3 pages.

"Fungible vs nonfungible tokens: What is the difference?" Cointelegraph, 2023, 5 pages, retrieved online https://cointelegraph.com/nonfungible-tokens-for-beginners/fungible-vs-nonfungible-tokens-what-is-the-difference#:~:text=The%20main%20difference%20between%20fungible,academic%20title%20or%20an%20artwork.

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

International Search Report and Written Opinion for International Application No. PCT/EP2020/060588, dated Jun. 24, 2020, 13 pages.

International Search Report and Written Opinion for International Application No. PCT/EP2020/072325, dated Nov. 6, 2020, 11 pages.

International Search Report and Written Opinion for International Application No. PCT/US2019/046532, dated Dec. 2, 2019, 10 pages.

International Search Report and Written Opinion for International Application No. PCT/US2019/046808, dated Dec. 2, 2019, 9 pages.

International Search Report and Written Opinion for International Application No. PCT/US2019/056646, dated Jan. 15, 2020, 11 pages.

International Search Report and Written Opinion for International Application No. PCT/US2019/057246, dated Feb. 4, 2020, 8 pages.

International Search Report and Written Opinion for International Application No. PCT/US2019/057262, dated Jan. 24, 2020, 9 pages.

International Search Report and Written Opinion for International Application No. PCT/US2020/061243, dated Feb. 22, 2021, 12 pages.

International Search Report and Written Opinion for International Application No. PCT/US2021/027448, dated Jul. 23, 2021, 11 pages.

International Search Report and Written Opinion for International Application No. PCT/US2020/028128, dated Jun. 25, 2020, 9 pages.

International Telecommunication Union, Telecommunication Standardization Sector, Focus Group on Application of Distributed Ledger Technology, DLT-O-067, Output Document, "Updated baseline text: D4.1-DLT regulatory framework," Apr. 2019, 45 pages.

ISO 20022, "A single standardisation approach (methodology, process, repository) to be used by all financial standards initiatives," May 2013, [Online], Retrieved from the Internet: https://www.iso20022.org/, 6 pages.

ISO 6166—ISIN—International Securities Identification Number, [Online], Retrieved from the Internet: https://www.isin.net/iso-6166/, Retrieved from the Internet: May 2, 2021, 9 pages.

ISO 6166:2013, "Securities and related financial instruments International securities identification numbering system (ISIN)," Jul. 2013, [Online], Retrieved from the Internet: https://www.iso.org/standard/44811.html, 3 pages.

Kim, H., et al., "Perpetual Contract NFT as Collateral for DeFi Composability," IEEE Access, 2022, vol. 4, 8 pages.

Konda, C., "Introduction to EY Nightfall—How does it make token transactions private?", Jun. 10, 2019, 12 pages.

Kosba, A. et al., "Hawk: The Blockchain Model of Cryptography and Privacy-Preserving Smart Contracts," 2016 IEEE Symposium on Security and Privacy, May 2016, pp. 839-858.

Kyle, L., "Overview of EY Nightfall," Jun. 13, 2019, [Online], Retrieved from the Internet: https://medium.com/coinmonks/overview-of-ey-nightfall-f9e9ce21cf65, 11 pages.

Lee, C. H. et al., "Implementation of IoT system using blockchain with authentication and data protection," 2018 International Conference on Information Networking (ICOIN), IEEE, Jan. 10, 2018, pp. 936-940.

Lielacher, A., "Ernst & Young Rolls Out 'Nightfall' to enable private transactions on Ethereum," Brave New Coin, Jun. 7, 2019, [Online], Retrieved from the Internet: https://bravenewcoin.com/insights/ernst-and-young-rolls-out-'nightfall-to-enable-private-transactions-on, 6 pages.

Lockyer, M., "EIP-998: ERC-998 Composable Non-Fungible Token standard [DRAFT]," Ethereum Improvement Proposals, No. 998, Jul. 2018, 35 pages. [Online serial], Available: https://eips.ethereum.org/EIPS/eip-998.

Lockyer, Matt, "Introducing Crypto Composable," Medium, Apr. 14, 2018, 7 pages, https://medium.com/coinmonks/introducing-crypto-composables-ee5701fde217.

Menezes, A. et al., "Key Management Techniques," Chapter 13 in Handbook of Applied Cryptography, CRC Press, Boca Raton, FL, (1996), pp. 543-590.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

Nightfall, 2019, 16 pages.

Nitulescu, A., "zk-SNARKs: A Gentle Introduction," 2022, 49 pages.

OECD (2017), "Commentary on Article 10 Concerning The Taxation on Dividends," In Model Tax Convention on Income and on Capital: Condensed Version 2017, OECD Publishing, Paris, [Online], Retrieved from the Internet: https://read.oecd-ilibrary.org/taxation/model-tax-convention-on-income-and-on-capital-condensed-version-2017_mtc_cond-2017-en, pp. 231-253.

OECD (2020), Centre for Tax Policy and Administration, Glossary of Tax Terms, "Withholding Tax," [Online], Retrieved from the Internet: https://www.oecd.org/ctp/glossaryoftaxterms.htm., 23 pages.

OECD (2020), "TRACE XML Schema: User Guide," OECD, Paris [Online], Retrieved from the Internet: http://www.oecd.org/tax/exchange-of-tax-information/trace-xml-schema-user-guide.htm, 70 pages.

OECD, "Action 13 Country-by-Country Reporting," [Online], Retrieved from the Internet: https://www.oecd.org/tax/beps/beps-actions/action13/, 7 pages.

OECD, Common Reporting Standard (CRS)—Organisation for Economic Co-operation and Development, "What is the CRS?" Jul. 15, 2014, [Online], Retrieved from the Internet: https://www.oecd.org/tax/automatic-exchange/common-reporting-standard/, 3 pages.

OECD, "TRACE Implementation Package," Jan. 23, 2013, [Online], Retrieved from the Internet: https://www.oecd.org/ctp/exchange-of-tax-information/TRACE_Implementation_Package_Website.pdf, 135 pages.

Office Action for U.S. Appl. No. 16/283,452, dated Jul. 10, 2019, 31 pages.

Office Action for U.S. Appl. No. 16/283,452, dated Nov. 6, 2019, 34 pages.

Office Action for U.S. Appl. No. 16/848,269, dated Sep. 8, 2021, 22 pages.

Office Action for U.S. Appl. No. 16/848,506, dated Sep. 13, 2021, 8 pages.

Office Action for U.S. Appl. No. 16/869,944, dated Dec. 3, 2020, 24 pages.

Office Action for U.S. Appl. No. 16/869,944, dated May 21, 2021, 22 pages.

(56) References Cited

OTHER PUBLICATIONS

Office Action for U.S. Appl. No. 16/904,296, dated Apr. 5, 2022, 33 pages.
Office Action for U.S. Appl. No. 16/904,296, dated Jun. 10, 2021, 27 pages.
Office Action for U.S. Appl. No. 16/904,296, dated Oct. 21, 2021, 31 pages.
Office Action for U.S. Appl. No. 16/952,949, dated Jun. 15, 2021, 23 pages.
Office Action for U.S. Appl. No. 16/952,949, dated Sep. 30, 2021, 25 pages.
Office Action for U.S. Appl. No. 17/231,467, dated Feb. 16, 2022, 29 pages.
Office Action for U.S. Appl. No. 17/231,467, dated Oct. 1, 2021, 34 pages.
Olsson, Oskar, "A Taxonomy of Non-Fungible Tokens," Uppsala University Department of Informatics and Media, Thesis Defense, 2022, 47 pages.
Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).
Parno, B. et al., "Pinocchio: Nearly practical verifiable computation," S&P (2013), 16 pages.
Planta, F., European Securities and Markets Authority (esma), European Parliament—FISC Sub Committee on Fiscal Matters, "Public hearing on" Cum/Ex and Cum/Cum scandal, Feb. 22, 2021, ESMA70-155-11890, Retrieved from the Internet: https://www.esma.europa.eu/sites/default/files/library/esma70-155-11890_statement_cumex_cumcum_scandal_-_fabrizio_planta.pdf, 3 pages.
Reiff, N., "What is ERC-20 and What Does it Mean for Ethereum?," Investopedia, Jan. 26, 2022, 8 pages.
Romano, Diego et al., "Beyond Bitcoin: Recent Trends and Perspectives in Distributed Ledger Technology," Cryptography, 2021, vol. 5, No. 36, pp. 1-45. https://www.mdpi.com/2410-387X/5/4/36.
Sankaran, A., "EY launches the world's first secure private transactions over the Ethereum public blockchain," EY Press Release, EYGM Limited, Oct. 2018, London, GB, 4 pages (2018).
Shahid, A. et al., "Blockchain-based agri-food supply chain: A complete solution," IEEE Access, IEEE, vol. 8, Apr. 2020, pp. 69230-69243.
Wang, X. et al., "STAMP: Enabling Privacy-Preserving Location Proofs for Mobile Users," IEEE/ACM Transactions on Networking, vol. 24, No. 6, Dec. 2016, pp. 3276-3289.
Westerkamp, M., et al., "Blockchain-based supply chain traceability: Token recipes model manufacturing processes," 2018 IEEE Confs on Internet of Things, Green Computing and Communications, Cyber, Physical and Social Computing, Smart Data, Blockchain, Computer and Information Technology, Congress on Cybermatics, IEEE, Jul. 2018, pp. 1595-1602.
Wu, H., "DIZK: Distributed zero-knowledge proof systems," In USENIX Security (2018), 35 pages.
Zhang, Y. et al., "Z-Channel: Scalable and efficient scheme in zerocash," 2017, [Online], Retrieved from the Internet: https://eprint.iacr.org/2017/684, pp. 1-39.

\* cited by examiner

FIG. 10

Create a BOM
Define BOM Details

☐ Start from an existing BOM

BOM ID
Type here

Part Name
Type here

HS Code and Description
Selection

Transaction Value of Total BOM
Type here

Total Net Cost of BOM
Type here

Labor Cost
Type here

Overhead Cost
Type here

FIG. 11

INTELLIGENT ASSERTION TOKENS FOR AUTHENTICATING AND CONTROLLING NETWORK COMMUNICATIONS USING A DISTRIBUTED LEDGER

CROSS-REFERENCE TO RELATED APPLICATIONS

This application is a continuation of U.S. patent application Ser. No. 17/231,467, filed Apr. 15, 2021 and titled "Intelligent Assertion Tokens For Authenticating And Controlling Network Communications Using A Distributed Ledger," which claims priority to and the benefit of U.S. Provisional Patent Application No. 63/010,598, filed Apr. 15, 2020 and titled "Systems and Methods for Authenticating and Controlling Network Communications to Transfer Tokenized Trade-Related Assertions Via a Distributed Ledger," the content of which are incorporated by reference herein in their entireties.

TECHNICAL FIELD

The present disclosure generally relates to authenticating and controlling network communications involving intelligent tokens on a distributed ledger such as a blockchain, within a digital processing system.

BACKGROUND

In a distributed ledger context, transaction speed can be defined as the rate at which data is transferred from one account to another. Distributed ledger transaction speeds can depend on a variety of factors, such as block size, block time, traffic on the network, and transaction fees. In some known distributed ledger systems, as the number of transactions increases, the transaction speed can be negatively impacted due to transaction delays and the placement of transactions into a pending, or "queued," state. Moreover, fluctuations in transaction speed can result in poor consistency (and high variability/unpredictability) in the performance of the distributed ledger system. Such issues are slowing the widespread adoption of distributed ledger platforms. As such, methods for reducing network traffic, increasing transaction speeds, and improving the overall predictability of a distributed ledger system are desirable.

SUMMARY

A method for generating assertion intelligent tokens (also referred to as "security tokens" or "assertion tokens"; hereinafter "tokens") at multiple steps within a supply chain includes generating a first assertion token, in advance of and/or during a first step of a supply chain process. The generation of tokens can be based on a Country of Origin (COO) assertion, a compliance declaration (also referred to herein as a non-COO assertion), a Bill of Materials (BOM), and/or duty/tariff rules. The first assertion token is transmitted or transferred to a receiving party, and the receiving party can inspect it to determine validity and/or applicability. If the first assertion token is not valid or applicable, the transfer transaction of the first assertion token is rejected. If the first assertion token is determined to be valid, the receiving party can approve the use of the first assertion token. The first assertion token can be passed to a second step of the supply chain process, and a second assertion token may be generated based on the first assertion token and transmitted or transferred to a second receiver. The second assertion token is inspected to determine validity and/or applicability. If the second assertion token is determined to be not valid or applicable, the transfer of the second assertion token is rejected. If the second assertion token is determined to be valid, a further transmission and/or transaction based on the second assertion token to a further step of the supply chain process or to an end consumer is authorized.

In some embodiments, a method for authenticating a network communication referencing a transaction of a good within a supply chain includes representing qualifications for one or more duty benefits as a set of dependencies on assertions made by one or more producers, exporters and/or suppliers. The assertions include assertions about attributes of goods, such as country of origin or admissibility (such as "no forced labor"). The assertions are tokenized on a distributed ledger such as a blockchain network, and the assertion tokens can reference one or more documents. One or more claims for the admissibility and/or duty benefit(s) are validated or invalidated based on the flow of the tokenized assertions. The assertions can include one or more claims (i.e., qualifies for reduced duties or tariffs on the goods, and/or produced without forced labor).

BRIEF DESCRIPTION OF THE DRAWINGS

Figure 10:
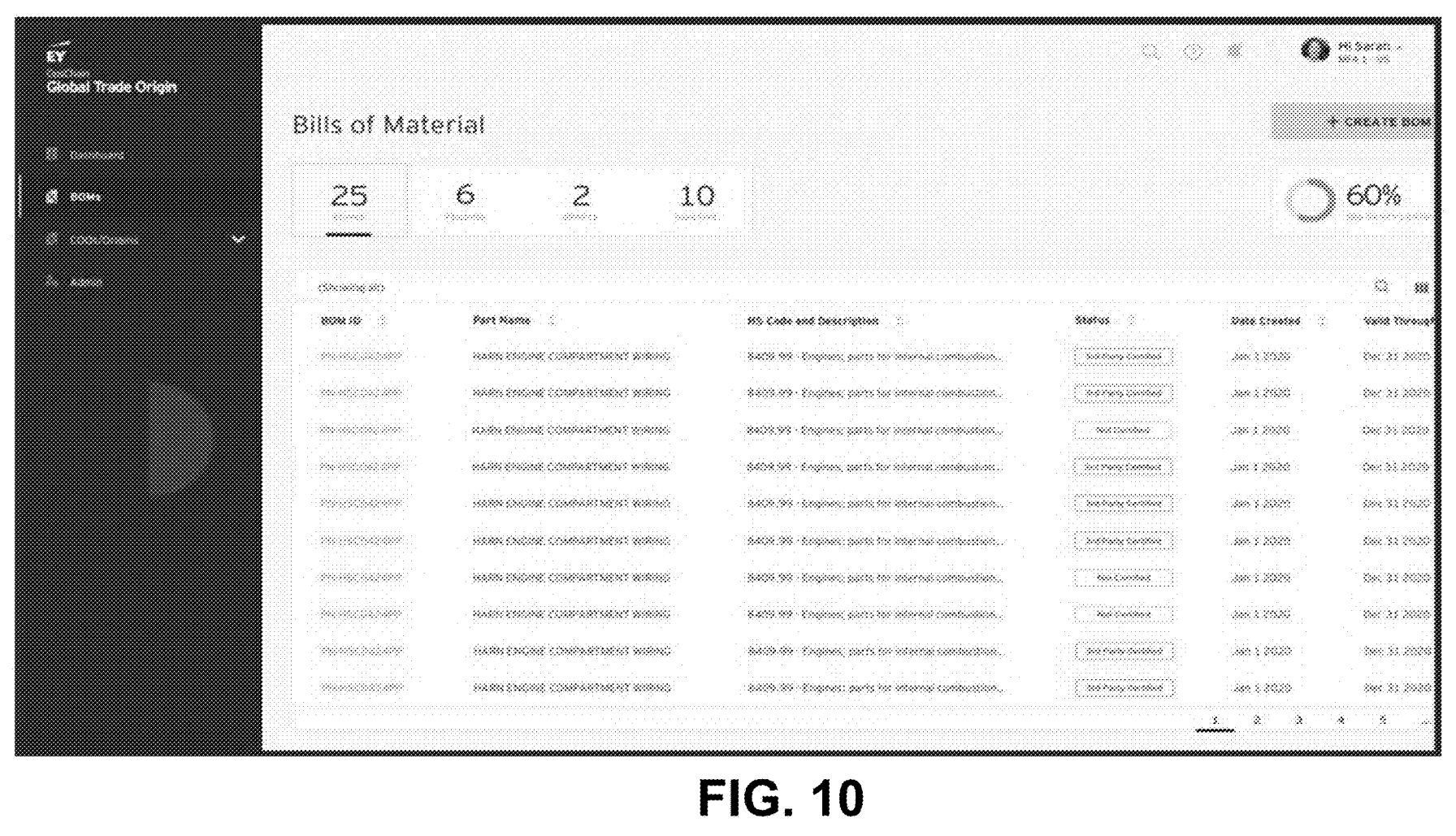

FIG. 10 is an example graphical user interface (GUI) screen showing bills of material, according to some embodiments.

FIG. 11 is an example GUI screen for defining BOM details, according to some embodiments.

DETAILED DESCRIPTION

Figure 1:
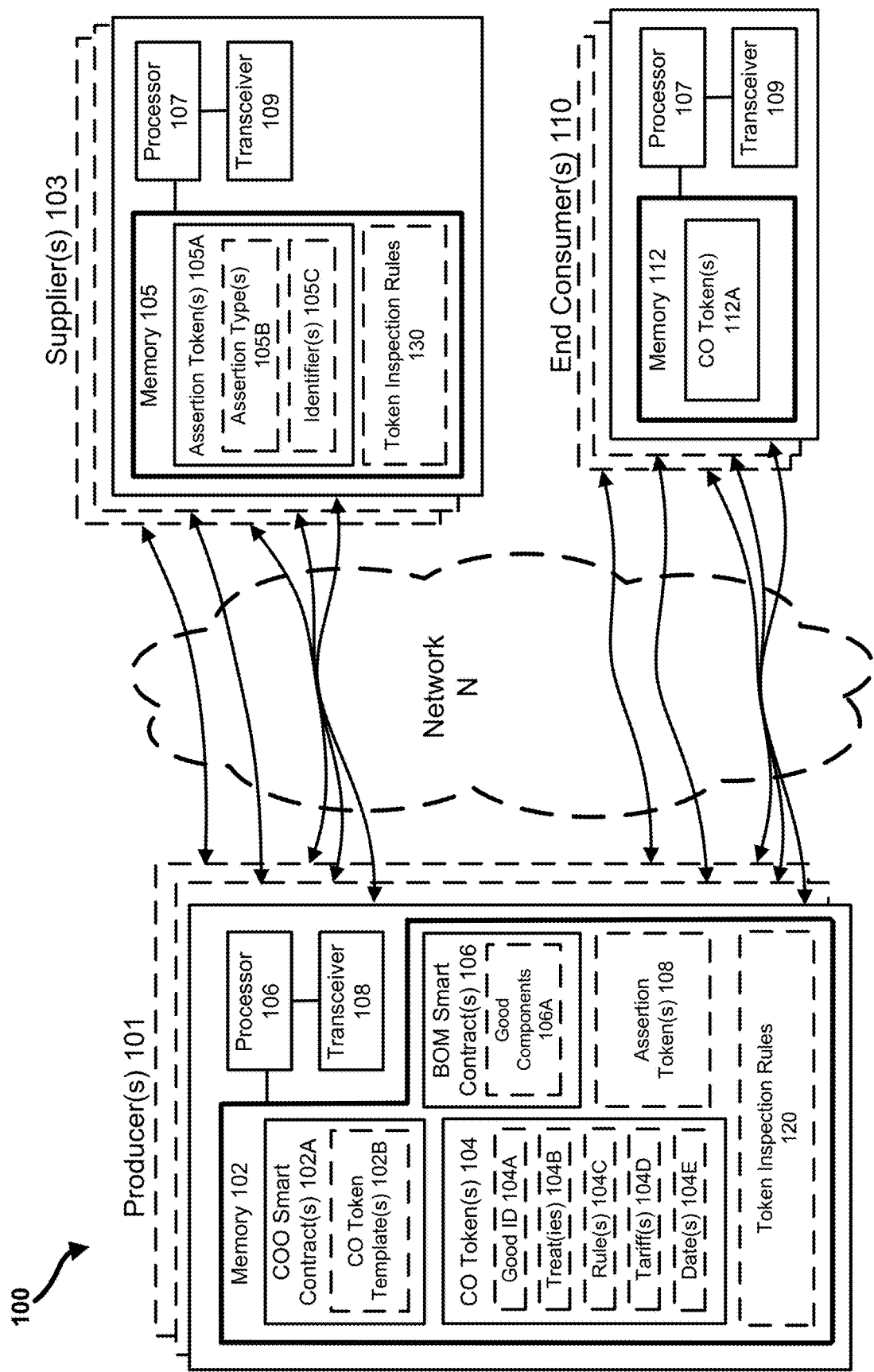
FIG. 1 is a system diagram illustrating a system for transacting Certificate of Origin (CO) tokens, according to some embodiments.

A preferential trade agreement is an agreement that establishes a trading bloc (e.g., via a trade pact) within which preferential access is given to certain products/goods that are traded from the participating countries. The preferential access can include a reduction in tariffs. A free trade agreement is a type of preferential trade agreement in which two or more nations agree to reduce barriers to imports and exports among them. A non-preferential trade agreement establishes punitive tariffs or duties on certain goods originating from one or more specified countries, and these additional tariffs or duties can be avoided by establishing that a good did not originate from the specified country or countries. Separate and apart from whether a good qualifies for preferential (i.e., a trade agreement) or non-preferential (i.e., retaliatory tariffs) treatment is admissibility. An example of "admissibility" is under U.S. law, it is illegal to import goods into the U.S that are made wholly or in part by forced labor, which includes convict labor, indentured labor, and forced or indentured child labor. There are many government agencies such as the FDA, FTC, and NHTSA, that require the importer of a good to assert (i.e., attest or certify) that such good complies with said admissibility requirements.

Goods imported into countries may be subject to duties, unless they qualify under a preferential or non-preferential trade program. Examples include free trade agreements (FTAs), such as the North American Free Trade Agreement (NAFTA), and certification statements. To obtain duty benefits under an FTA or to avoid protective trade tariffs, importers must verify or "prove" the country of origin of the traded goods. To prove the country of origin of the traded goods, the importer requests Certificates of Origin (COs) from its suppliers in which the suppliers "attest" to the origin of the goods. Typically, the importer of record has the COs on hand when they make their preferential treatment claim(s).

Obtaining COs from suppliers is a manual, inefficient and costly process during which vast amounts of paperwork be exchanged between parties. Typically, large multinationals utilize FTA and transportation management software to solicit COs. However, their suppliers (and sub-suppliers) often lack sophisticated software and rely on manual processes such as printing, signing, and scanning COs, and transmitting via e-mail, web portal, fax, or a similar process. Moreover, as suppliers often sell the same product to multiple customers in different countries, they are typically required to provide COs for the same part in multiple formats, increasing the volume of documentation and related costs, and resulting in redundancy and inefficiency. As used herein, customers are defined as recipients of intelligent assertion tokens, and can include suppliers, producers, importers and/or end consumers. As used herein, an "intelligent assertion token" includes a character string that is associated with a set of assertions and/or smart contracts. For example, an intelligent assertion token can include cryptographic hashes that represent storage locations of assertion data or other data within a storage location that is remote from a distributed ledger (e.g., blockchain) on which the intelligent assertion token is transacted.

In addition, there is a high cost, in terms of money, time and/or computational resources, associated with compliance with rules of origin. For example, each of the 400+ FTAs globally contain thousands of product-specific "Rules of Origin" which can individually be highly complex. For example, NAFTA alone has 2,000 different sets of rules for autos, trucks, and parts. Studies estimate the cost of compliance to be in a range of ~3-8% of the value of the traded good. According to a survey by the International Trade Centre, complying with Rules of Origin is the most problematic non-tariff measure manufacturing companies in developing countries face in conducting global trade.

Preferential and non-preferential trade programs and compliance requirements are changing rapidly, increasing the risk of non-compliance and/or high error rates due to the use of wrong, incomplete or outdated information and/or human error, resulting in a lack of trust in such information. Counterparties (e.g., importers, producers, etc.) face uncertainty regarding whether suppliers, who often perform manual origin calculations in spreadsheets, will be able to keep up with all the changes to the preferential or non-preferential trade programs and compliance requirements and provide the correct data to support their origin claims. Complex supply chains and lot-to-lot variances increase the probability that origin of a shipment is incorrectly claimed under an issued CO. In addition, suppliers are reluctant to provide supporting documentation that would disclose competitive margin and sourcing information.

Government authorities typically have three to five years to audit a preferential duty claim. Due to a lack of visibility and monitoring, irregularities generally stay undiscovered until they come to light during a customs audit several years after the fact. A study carried out by the World Customs Organization found that 44% of surveyed countries reported irregularities in origin claims. For customs authorities, invalid FTA claims result in a loss of tax revenue, and can undermine trade policy. For importers, invalid FTA claims can result in penalties, interest, detention of goods, reputational harm, or even personal liability for the party that attested to the origin claim. Due to both the risk of financial penalties if they incorrectly claim origin, as well as the high cost of compliance, importers may choose to forego FTA benefits.

Known free trade agreement (FTA) management software does not provide the immutable proof of origin facilitated by the Global Trade Origin blockchain solution set forth herein. In addition, known track-and-trace solutions do not provide the end-to-end formulaic logic and complexity of satisfying the rules of origin of goods offered by the systems and methods set forth herein. These known solutions do not address the problem of traceability of origin or admissibility claims across multiple tiers of a supply chain, or address the problems of redundant information between a given supplier of a good and multiple customers of that same good. By combining tokens with a layer of smart contracts capable of automating workflows across multiple parties, the "origin system" set forth herein provides an additional layer of trust regarding the origin of a good. Systems and methods set forth herein also permit third parties specializing in origin determinations or governments or government-authorized agents to review documentation provided by suppliers and then certify that the relevant rule of origin for preferential or non-preferential treatment, or other government agency admissibility requirement (e.g., produced with no forced labor) has been satisfied, which increases the level of trust even more. Moreover, some known private (permissioned) distributed ledger platforms require parties to run the distributed ledger themselves and incur costs for the initial platform build, onboarding costs, hardware costs, cloud costs, ongoing maintenance costs and monitoring costs. Distributed ledger platforms addressing only certain aspects of supply chain operations are not easily compatible with other supply chain solutions based on distributed ledger technology, especially those that leverage the tokenization of goods.

To address the shortcomings of known systems described above, the present disclosure sets forth systems and methods that facilitate the admissibility requirements and/or qualification of goods under preferential or non-preferential rules of origin, by representing the requirements to qualify as a set of dependencies on assertions made by producers, exporters or suppliers as to certain attributes of their goods (e.g., country of origin), tokenizing these assertions on a distributed ledger such as a blockchain network, and using the flow of these tokens along with the documents they reference to validate claims to reduced duties or tariffs on those goods, or validating that a tariff should not apply to those goods. Systems and methods set forth herein can also control the flow of network traffic between different parties pertaining to the supply chain(s) of goods by inspecting tokens associated with the goods at each of multiple levels or stages of the supply chain, and deciding based on the inspection whether the token is authorized to be transmitted to a next level or stage within the supple chain. The tokens can include Certificate of Origin (CO) tokens and/or other types of non-CO assertion tokens. Authorization to be transmitted can be determined based on one or more assertions about a good, such as countries of origin referenced by the CO tokens and/or one or more requirements under a preferential or non-preferential trade agreement referenced by the assertion tokens. For example, in some embodiments, a token issuance or a token ownership transfer is "gated" by a prerequisite event (or set of events) in which one or more predefined assertions have been at least one of received, validated, verified, or satisfied. In other words, a transfer of ownership of a given token may be blocked or prevented unless and until the prerequisite event has been completed, for example in accordance with one or more predefined rules. By ensuring that token ownership transfers do not occur within a distributed ledger (i.e., a representation of the token ownership transfer is not generated and/or is not stored on or written to the distributed ledger) until a prerequisite event has been satisfactorily completed, the network traffic associated with such ownership transfer transactions can be reduced, thereby increasing the associated transaction speeds and improving the overall stability and predictability of a distributed ledger system in which the solution is implemented.

In some embodiments, assertions about a country of origin are tokenized, and the tokenized assertions can be used as digital equivalents of Certificates of Origin (COs) and/or similar declarations commonly used in cross-border trade. A CO can therefore function as a declaration and attestation of the Country of Origin (COO) of a good. The transfer of a CO token from a supplier to a customer makes that token available for use by that customer. The customer can use a CO token to automatically resolve one or more dependencies on that COO assertion for products the customer is producing. The set of dependencies on COO assertions can be used, for example, to determine whether a given good qualifies under preferential or non-preferential rules of one or multiple trade agreements and/or other government agency laws that may be enforced by customs border agencies (collectively referred to herein as "trade programs").

In some embodiments, a software template to generate a given CO assertion token ("CO token") is represented as a country of origin smart contract ("COO contract") that is published ("deployed") on a distributed ledger such as a blockchain network. Each CO token issued ("minted") based on the COO contract represents the usage of that COO assertion within one or more commercial transactions between a supplier and its customer, or more generally between a party acting on behalf of an exporter of a good and a party acting on behalf of an importer of that good. A CO token is uniquely identified by a unique identifier, and can therefore be classified, for example, using blockchain nomenclature as a non-fungible token (NFT).

The recipient of an assertion token (also referred to herein as a "customer" or "solicitor"), when receiving the assertion token from an issuer thereof, can use the CO token to resolve dependencies on the assertion for qualifying goods that it produces under a given trade program. These dependencies can be referenced directly in a COO contract for a good being produced, or indirectly through another smart contract referenced in that COO contract. Once that customer has received sufficient tokens to resolve its dependencies for a given product that it is producing, that customer, who is now acting as the producer of its own good, can in turn use its own COO contract with the resolved dependencies to issue (mint) its own CO tokens for its product, for use by its downstream customers. This process can be repeated at each step of a supply chain. At each such step of the supply chain, the CO token associated with that step may be inspected by a processor, according to inspection rules stored in a memory operably coupled to the processor, prior to transmission of that CO token or upon receipt of the CO token. The processor may authorize the CO token to be transmitted or received, or may block the CO token from being transmitted or received, depending on the outcome of the application of the inspection rules. In some embodiments, inspection of the CO token is performed according to a set of rules defined, for example, by one or more smart contracts, examples of which can include the BOM smart contract, the COO smart contract, and/or the non-COO smart contract, and/or by operations external to the distributed ledger which record the results on the distributed ledger through transactions mediated by one or more of these smart contracts, as discussed herein.

For COO assertions, the assertion smart contract describes the good, the trade program being referenced, and additional properties such as the manner of asserting that the good qualifies under the free trade agreement, the time period of validity of the assertion, the country of origin being claimed for the good or some other type of claim being asserted about the origin of the good being produced, and any other attributes required to meet the qualification. A COO assertion can also include a commonly used identifier such as a Harmonized Tariff Schedule (HTS) code, used in classifying goods for customs and tariff purposes. Depending on the type of the COO assertion, a percentage or other value may be supplied to indicate the relative value of the good that can be attributed to the specified country of origin. In some embodiments, the assertion smart contract can manage a workflow associated with the assertion token or codify rules for determining the eligibility under a given preferential or non-preferential trade agreement. In some embodiments, the assertion smart contract is configured to automatically perform one or more calculations and generate one or more COO assertions based on the one or more calculations.

In some embodiments, a distributed ledger-implemented (e.g., blockchain-implemented) system manages and exchanges Certificates of Origin and similar declarations related to cross-border commerce. The system can be configured to manage assertions related to the qualification of a good for preferential or non-preferential duties or tariff treatment, tokenize these assertions, and use the flow of these tokens to automate administrative Country of Origin (COO) processes for cross-border supply chains.

According to embodiments set forth herein, a distributed ledger such as a blockchain network uses smart contracts to manage the exchange of tokenized Country of Origin (COO) declarations among entities participating in one or more supply chains. Some systems set forth herein are referred to as a "Global Trade Origin blockchain."

According to some embodiments, once a Certificate of Origin token (CO token) has been issued on the blockchain ledger, the transaction cannot be altered. Also, through the application of smart contracts, the creation and exchange of COs can be managed at every step of the production process, thereby increasing the level of trust and reliance on trade preference eligibility. Embodiments set forth herein facilitate real-time analysis of supplier COs and immediate notification of changes in costing data and FTA qualification to all downstream producers and importers. Systems set forth herein also allow government authorities, government-authorized agencies and third parties specializing in origin determinations to independently certify origin claims on the blockchain ledger.

In addition, systems of the present disclosure can eliminate the need for manual CO solicitation, obtaining wet signatures on original paper forms and documents, and duplicative data entry by parties throughout the supply chain. Parties within the supply chain can therefore quickly and easily request COs from suppliers who can then send their own proof of origin to the requested party. Suppliers can enter origin details in the system once, and then transfer COs to all their customers in one single format. Furthermore, by standardizing data fields and formats for COs (with tailored fields per FTA) the Global Trade Origin platform harmonizes and streamlines trade compliance across various FTA's and improves FTA utilization. As access to data can be limited to certain authorized stakeholders, parties can efficiently share information about the origin of a good while keeping sensitive BOM, component pricing and sourcing information private.

Compliance Declarations

In addition to COO assertions, in some embodiments, a tokenized assertion can specify other types of assertions about a good. These other types of assertions (compliance declarations) can be used to qualify a good for a reduced duties or tariffs, or to validate that a tariff or other customs regulation is not applicable to that good. These assertions can be made in an affirmative sense (e.g., the average labor cost for producing this good is at least $16/hr) or in a negative sense (e.g., no child labor was used in the production of the good). Examples of compliance declarations include: no forced labor used in the production of this good, no child labor, no conflict minerals, Lacey Act declarations, Kimberley diamond declaration, civil aircraft and parts airworthiness certificates, and intellectual property rights declarations.

Compliance declarations are increasingly required under the rules of various trade agreements and other trade programs. The additional assertions can be embedded within a CO assertion token as additional attributes, or alternatively can be issued as their own free-standing assertion tokens from either a COO contract or other type of assertion contract.

In some embodiments, a software template for generating free-standing compliance declarations is represented in a distributed ledger network, such as a blockchain network, as a smart contract ("compliance declaration contract"). Compliance declaration tokens can be generated (minted) on the blockchain network based on the compliance declaration contract.

Blanket Assertion Tokens and Shipment Assertion Tokens

There are two major categories of assertion tokens: blanket assertion tokens (or "blanket tokens") and shipment assertion tokens (or "shipment tokens"). Blanket assertion tokens can be issued periodically, can cover all shipments of the same good (from the same supplier) over a specified blanket period. In a typical usage pattern, a blanket assertion is issued for an entire model year of shipments of the same part (from the same supplier) for a named trade program. Blanket assertion tokens can also include references to (and thereby supply) supporting documentation such as purchase orders.

Shipment assertion tokens are issued for each shipment of a given good (from a given supplier). Shipment assertion tokens can also include references to (and thereby supply) related shipping documents or other supporting documentation. Since shipment assertion tokens can be expected to be issued at a greater frequency than blanket assertion tokens, and the shipments assertion tokens can reference additional supporting documentation for each shipment, shipment tokens may be interpreted as providing a higher level of confidence in the assertions being made, as compared to blanket tokens.

A given assertion contract can be used as a template for generating either blanket assertion tokens or shipment assertion tokens. It is also possible for the same assertion contract to be used to generate both blanket tokens and shipment tokens. The choice of generating a blanket or shipment token can be based on the preferences of the parties to a transaction (e.g., the manufacturer/exporter and buyer/importer) for the frequency or type of assertions expected for the same good. In the case where the same party receives both blanket and shipment tokens for the same good, the recipient of the tokens can determine if the blanket token is sufficient to resolve a dependency on that assertion or if shipment tokens are required before resolving that dependency.

Bills of Materials (BOMs)

A Bill of Materials (BOM) can specify one or more parts, obtained from one or more suppliers, that can be correlated to a set of dependencies on supplier assertions that must be met to satisfy the requirements encoded in the COO contract. In some embodiments, a COO assertion smart contract references one or more Bills of Materials (BOMs) for producing the good. Each BOM can also specify other dependencies on assertions required either at the level of an individual part, or at the level of the total BOM, for meeting the requirements for preferential or non-preferential duties or tariff treatment. These other dependencies can include assertions about the labor content, overhead, import/export procedures, or statements of meeting the requirements of a regulatory process.

In some embodiments, if a COO contract references a BOM, it also includes a cryptographic hash derived from a scanned image of the BOM or derived from an electronic representation of the BOM. The purpose of the cryptographic hash is to support verification of a copy of the BOM used, at a later time, as part of the chain of evidence of an assertion token's validity.

Alternatively, in other embodiments, a BOM is represented on the blockchain as a smart contract ("BOM smart contract"). The COO contract can reference the BOM contract, and the cryptographic hash of the BOM can then be included in the BOM contract. A BOM contract can represent the contents of the BOM at either a summary level without listing the detailed dependencies, or include specifications of the dependencies on BOM parts or other types of dependencies.

If a BOM contract includes specifications of the BOM dependencies, then the resolution of these dependencies can be recorded on the blockchain through transactions referencing the dependencies defined in the BOM contract. This provides a shared record on the blockchain of the resolution of the BOM dependencies, and increase transparency of the dependency resolution process for a given BOM smart contract.

In some instances, the encoding of the BOM parts and other dependencies in a BOM smart contract may be considered commercially disadvantageous, since it can reveal confidential information about the BOM contents that should not be generally shared with all participants on the blockchain. To address these commercial concerns, and to preserve confidentiality, in some embodiments a BOM contract is specified at a summary level, such that the dependencies are implicitly referenced in the BOM contract but not explicitly defined in the BOM contract. When a BOM contract is specified at a summary level, the resolution of dependencies in the BOM may rely on information from the referenced BOM that is outside the contents of the BOM contract. In such instances, a blockchain transaction recording the resolution of a BOM dependency can reference the BOM contract, but verification of the dependency resolution process requires either retrieval of a copy of the referenced BOM or providing one or more other assurances that the dependency resolution was performed in a manner consistent with accepted practices. Techniques for assisting in such a verification process and techniques for providing assurances around the dependency resolution process are described below.

The Process of Resolving Dependencies

According to some embodiments, the use of assertion contracts and assertion tokens between a producer and its suppliers can be visualized as defining a set of "empty slots" in an assertion contract that can be "filled" with assertion tokens from the appropriate suppliers. When the producer creates a COO contract for a good, each "empty slot" defines either a specific part and its expected country of origin, or a compliance declaration and its expected source, or some combination thereof. When the producer receives an assertion token, that token can be matched against the "empty slots" in one or more COO contracts and "fill" the matching slot(s). The "empty slots" can either be defined directly on a COO contract, or defined in a BOM contract that is referenced by a COO contract, or defined in a BOM that is referenced by a BOM contract with the BOM contract referenced by a COO contract.

A matching token can "fill" any number of these empty slots in COO contracts, BOM contracts or BOMs maintained by that producer. A token can continue to fill these slots until it is invalidated, either by reaching an expiration date (defined in the assertion token) or being directly invalidated through either a transaction altering this token or receiving a matching token that directly invalidates prior tokens with the same matching criteria. If multiple valid tokens of the same type are received, these can all be associated with the slot(s). Receiving multiple valid tokens for a given slot over a period of time can be used as an indication that the assertion has been reaffirmed, and could potentially be interpreted as a higher level of confidence in its validity.

A single assertion token can fill multiple slots across different COO contracts, BOM contracts or BOMs by first associating the token with a given part and supplier, and then by reference filling any and all slots in COO contracts, BOM contracts or BOMs that match this part and supplier. This indirect mechanism for filling slots means that a token is not replicated when it is transferred from a supplier to its customer. The token retains its uniqueness, and it only has one owner at any given time. The entity (supplier or customer) is the owner of the token, not the slot in a COO contract, BOM contract or BOM. This conforms to the semantics of uniqueness of a non-fungible token. The slots are filled indirectly, by reference to the token. This indirect mechanism of filling slots minimizes the overhead in the matching process (compared to matching against each slot independently), simplifies the management of tokens, and allows multiple COO contracts, BOM contracts or BOMs to have their dependencies resolved by the same assertion token. This provides flexibility in how COO contacts, BOM contracts and BOMs are defined to meet varying requirements of different trade programs, or support multiple products or variants of a single product that use the same part from the same supplier.

Assertion tokens generated at a lower tier of a production supply chain can be used at the next level of the production process to resolve assertion contracts. The resolved assertion contracts at this level can then can be used to generate tokens for use in the next successive tier. The recursive nature of the process being described can continue through multiple tiers of an overall production process.

For example, in a multi-tiered supply chain, the assertion token generated (minted) from an assertion contract managed by a lower tier (e.g. Tier 3 supplier) can be consumed by the supplier at the next higher tier level (e.g. Tier 2 supplier). The Tier 2 supplier can use the transferred token to resolve a dependency referenced by an assertion contract that it manages, allowing the Tier 2 supplier to potentially generate one or more assertion tokens (once all its dependencies have been resolved), sending these tokens to its customers (Tier 1 producers).

In addition, intermediate processes can be supported, such as a supplier sending an assertion token to a shipping agent, and that shipping agent forwarding the assertion token by transferring it to the end customer.

BOM Components, Production BOMs and Partial BOMs

A COO contract can reference one or more BOM contracts for the good being produced, and BOM contract can reference one or more BOMs. Each BOM can define a set of components that, at a minimum, meet the requirements for preferential or non-preferential duties or tariff treatment specified in the COO contract. Each component can be a part taken from the producer's inventory and used in the production process ("part component"), a cost allocated to the production process such as labor or overhead or shipping ("cost component") or a requirement that must be met in order to qualify for the preferential or non-preferential duties or tariff treatment ("requirement component").

While a BOM can specify in detail all components used in the manufacturing process for the good (a "production BOM"), only the minimum set of components used for qualifying under the COO contract may be specified in a BOM (a "partial BOM"). Many free trade agreements allow a claim for preferential or non-preferential duties or tariff treatment based on meeting a minimum set of requirements, and therefore a partial BOM can be sufficient to meet these requirements.

For example, a preferential regime could require that 70% of the value of the good has been produced from parts originating within the countries covered under the free trade agreement, and therefore the components specified in a partial BOM can be limited to those needed to meet the relevant threshold. A partial BOM has many practical advantages in reducing the number of components that can be specified in the BOM or BOM contract to be included in a token, thus reducing the number and complexity of processing steps that are related to the number of components in a BOM.

Resolving BOM Component Dependencies Against Assertion Tokens

Each component in the BOM can specify one or more dependencies for meeting the preferential or non-preferential requirements of the associated COO contract. These dependencies are the "open slots" described above. A dependency can be resolved by associating at least one valid assertion token to that component. To determine if an assertion token can be used to resolve the component's dependency, the component defines the criteria used to match an assertion token to that component ("matching criteria"). An assertion token can meet the matching criteria to be considered a valid token for use in resolving the dependency defined by that component.

For a part component, an illustrative example of a matching criteria is to use the unique identifier ("unique ID") of a stock keeping unit ("SKU") for a part maintained in the producer's inventory. In this example, a CO token for a part from a supplier can be mapped into this SKU. The matching CO token becomes eligible for use in resolving the part dependency. A single CO token can be used to resolve part dependencies in multiple components within a single BOM or across multiple BOMs. A part component can also include a commonly used identifier such as a Harmonized Tariff Schedule (HTS) code, used in classifying goods for customs and tariff purposes, in order to facilitate the matching process.

The dependency resolution in this example has two independent steps. The first step is to map a CO token to the SKU, which can be done at the time the CO token is received by the producer (or minted by the producer as a proxy for the supplier). The second step is to use that CO token to resolve the dependency using the SKU matching criteria of the part component. The second step can be done at the time the producer is minting its CO token for the good it is producing.

In this example, the matching criteria can be further refined by specifying a country of origin, or list of countries of origin, that must be the source of parts stocked in the producer's inventory under that SKU. This limits the eligible CO tokens to those with a country of origin within the list specified by the part component's matching criteria.

In practice, the limitation on country or countries of origin could be enforced at the level of the SKU. Enforcing the limitation at the level of the SKU avoids any issues of resolving any ambiguity in resolving the matching criteria if a valid CO token from outside the allowed country or countries of origin is mapped to that SKU.

For a non-part component, the matching criteria specifies the method of matching an assertion token against the criteria, to qualify the assertion token as resolving the component dependency. For example, an assertion about the labor content of a manufacturing process, or an assertion that a supplier is not subject to international sanctions, or that sourcing of materials has been done in a way that conforms to an international treaty, can each be specified in a way that allows the application of a matching criteria to determine the eligibility to resolve a given dependency.

FIG. 1 is a system diagram illustrating a system for transacting Certificate of Origin (CO) tokens, according to some embodiments. As shown in FIG. 1, the system 100 includes one or more producers 101, one or more suppliers 103, and one or more end consumers 110, each participating in a supply chain for one or more good of interest. Depending upon the stage in, or scenario for, a given supply chain, the one or more producers 101 may serve as suppliers to one or more other producers 101, suppliers 103 and/or end consumers 110. Similarly, depending upon the stage in, or scenario for, a given supply chain, the one or more suppliers 103 may serve as producers, from the point of view of one or more other suppliers 103, producers 101, and/or end consumers 110. Any of the one or more producers 101, one or more suppliers 103, and one or more end consumers 110 can be an importer. The producers 101, suppliers 103, and end consumers 110 each have associated compute devices that can communicate with one another via the telecommunications network "N," which may be a wireless network, a wired network, or a combination of both. Each compute device of the producer(s) 101 includes a memory 102, a processor 106 operably coupled to the memory 102, and a transceiver 108 (e.g., an antenna) operably coupled to the processor 106. The memory 102 stores data and instructions (e.g., code) executable by the processor 106 to perform defined steps (i.e., software). As shown in FIG. 1, the memory 102 includes one or more CO token templates 102B, one or more CO tokens 104, one or more BOM smart contracts 106, and, optionally, one or more assertion tokens 108 and/or one or more token inspection rules 120. Each COO smart contract 102A can include one of more CO token templates 102B. Each CO token 104 can include one or more of: a good identifier ("Good ID") 104A, treaties 104B, rules 104C, tariffs 104D, and dates 104E (e.g., date ranges, such as a date range of applicability of a preferential trade agreement). Each BOM smart contract 106 can include data for good components 106A (e.g., a listing of parts associated with an assembled multi-component good).

Each compute device of the supplier(s) 103 includes a memory 105, a processor 107 operably coupled to the memory 105, and a transceiver 109 (e.g., an antenna) operably coupled to the processor 107. The memory 105 stores one or more assertion tokens 105A and, optionally, one or more token inspection rules 130. Each assertion token 105A can include assertion type(s) 105B and/or identifier(s) 105C. Each compute device of the end consumer(s) 110 includes a memory 112, a processor 107 operably coupled to the memory 112, and a transceiver 109 (e.g., an antenna) operably coupled to the processor 107. The memory 112 stores one or more CO tokens 112A.

In some implementations, COC and BOM data can be entered into the system (e.g., system 100 of FIG. 1) manually and/or via an electronic upload, for example of a BOM spreadsheet. In other implementations, the system can be configured to integrate with existing FTA modules and/or rules engines, e.g., via application programming interfaces (APIs) and/or enterprise resource planning (ERP) environments. In still other implementations, the system can integrate with ERP systems and be configured to receive information from supply chain track and trace solutions and/or other blockchain platforms.

In some embodiments, the system includes an origin core and an interaction layer. The origin core can run on a public/private Ethereum blockchain platform via which origin details are registered and/or exchanged. The interaction layer can include a user interface software for operating a node on the blockchain. Through the user software interface, data can be entered and retrieved by parties using the system. The system can also interact with other software, such as FTA rules engines, ERP systems, FTA/trade management systems and visualization, analysis tools and/or reporting tools.

Figure 2A:
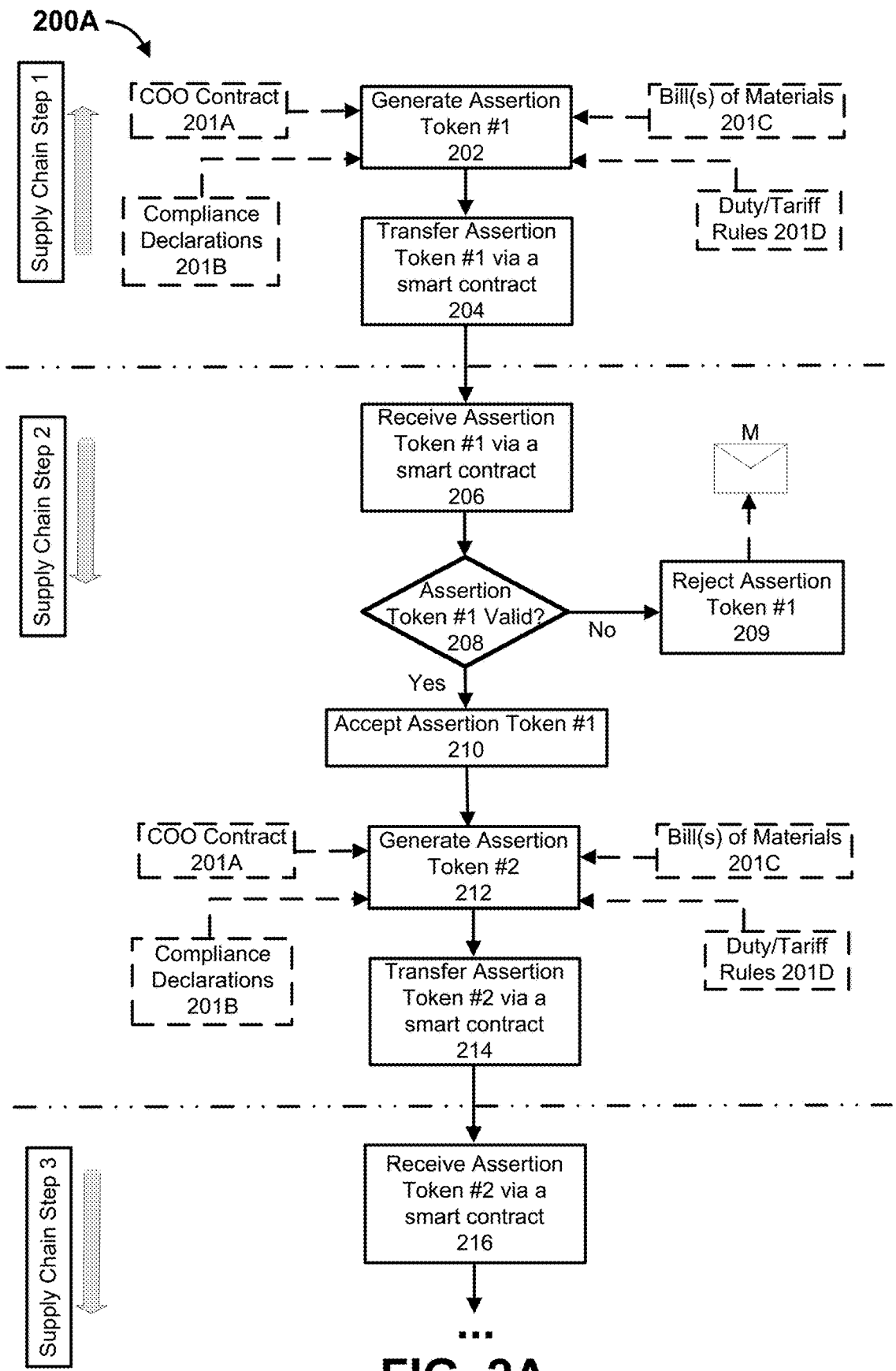
FIG. 2A is a flow diagram showing a method for generating assertion tokens at multiple steps within a supply chain, according to some embodiments.

FIG. 2A is a flow diagram showing a method for generating assertion tokens at multiple steps within a supply chain, according to some embodiments. The method 200A can be performed, for example, using the system 100 of FIG. 1. As shown in FIG. 2A, the method 200A begins during a first step (Supply Chain Step 1) of a supply chain process. At 202, a first assertion token (Assertion Token #1) is generated, optionally based on one or more of: a COO contract 201A, one or more compliance declarations 201B, one or more Bills of Materials 201C, and one or more duty/tariff rules 201D. At 204, the Assertion Token #1 is transferred to another participant (e.g., a supplier or producer) of a second step (Supply Chain Step 2) of the supply chain process, via a smart contract (e.g., via a change to a data field indicating an ownership of the Assertion Token #1), and the Assertion Token #1 is received at 206. At 208, the Assertion Token #1 is inspected to determine its validity. If Assertion Token #1 is not valid, the Assertion Token #1 is rejected, at 209. In response to such a rejection event, one or more additional actions can automatically occur (i.e., be triggered), including (but not limited to): causing generation and transmission of an alert or notification to an administrator, causing transmission of an alert or notification to a supplier or producer (e.g., via message "M," including a request to update tariff information or other data of the Assertion Token #1 to generate an updated Assertion Token #1 and a request to resend the updated Assertion Token #1), causing data about the rejection event to be stored in a database or local memory, etc. If Assertion Token #1 is determined to be valid, the Assertion Token #1 is accepted, at 210.

At 212, a second assertion token (Assertion Token #2) is generated, based on Assertion Token #1 and, optionally, one or more of: a COO contract 203A, one or more compliance declarations 203B, one or more Bills of Materials 203C, and one or more duty/tariff rules 203D. At 214, the Assertion Token #2 is transferred to another participant (e.g., a supplier or producer) of a third step (Supply Chain Step 3) of the supply chain process, via a smart contract (e.g., via a change to a data field indicating an ownership of the Assertion Token #2), and the Assertion Token #2 is received at 216. Subsequent to being received at 216, the Assertion Token #2 may be inspected for validity, e.g., in a manner similar to that described above with reference to steps 208-210.

Figure 2B:
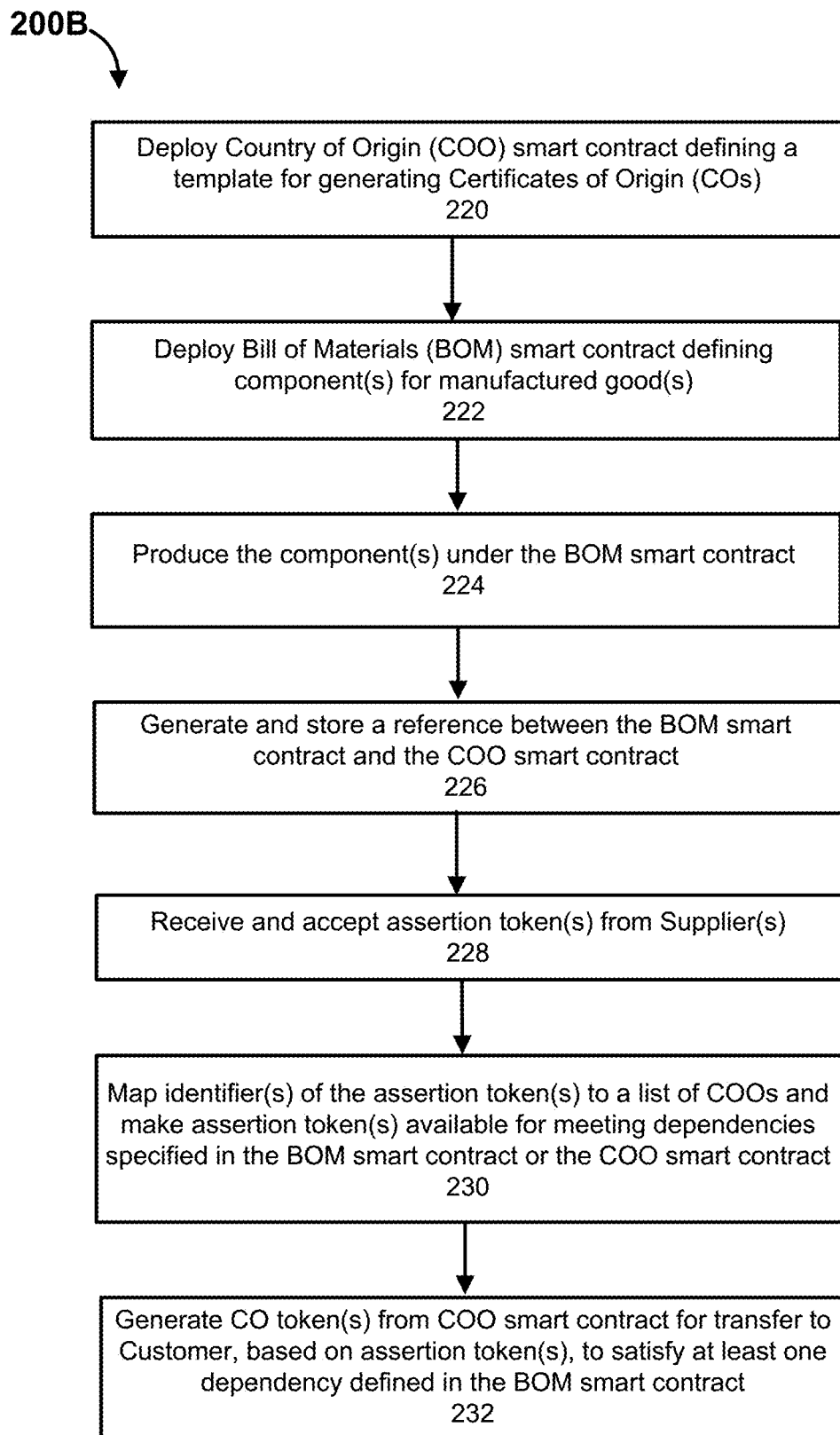
FIG. 2B is a flow diagram showing a method for generating CO tokens, according to some embodiments.

FIG. 2B is a flow diagram showing a method for generating CO tokens, according to some embodiments. The method 200B can be performed, for example, using the system 100 of FIG. 1. The steps of method 200B are performed, by way of example, in the context of the following:

1. Producer 1 deploys (at 220) a COO smart contract (COO Contract P1C1) defining a template for generating CO tokens, specifying: an identifier for classifying the good G1 being produced, the treaty and rule under the treaty being applied for preferential or non-preferential duties or tariff treatment, and a beginning and ending date for the period when any generated tokens can be considered valid.
2. Producer 1 also deploys, at 222, a BOM smart contract (BOM Contract P1B1) defining the components required to manufacture good G1, which meet the minimum requirements to qualify G1 for preferential or non-preferential duties or tariff treatment
3. Producer 1 also produces one or more components, at 224, under BOM Contract P1B1, where each component defines a dependency for an assertion token related to a given Part P1B1-1 or other type of assertion.
4. Producer 1 generates and stores, at 226, a reference between BOM Contract P1B1 and COO contract P1C1, so that BOM Contract P1B1 can be used to define the dependencies required to qualify G1 under the terms defined by the COO contract.
5. Supplier 2 creates an assertion token S2T1 for an assertion of type A and identifier XYZ.
6. Supplier 2 transfers assertion token S2T1 to Producer 1.
7. Producer 1 receives and accepts, at 228, the transfer of assertion token S2T1 from Supplier 2.
8. Producer 1 maps, at 230, the identifier XYZ of S2T1 to its list of either COOs or other types of assertions, and makes S2T1 available for meeting dependencies specified in either a BOM contract or COO contract.
9. Producer 1 generates, at 232, a CO token P1T3 from COO contract P1C1 for transfer to Customer C, based on using in part S2T1 to satisfy the dependency defined for component P1B1-1 defined in BOM Contract P1B1.

Illustrative Example of Resolving BOM Dependencies with Assertion Tokens

Figure 3:
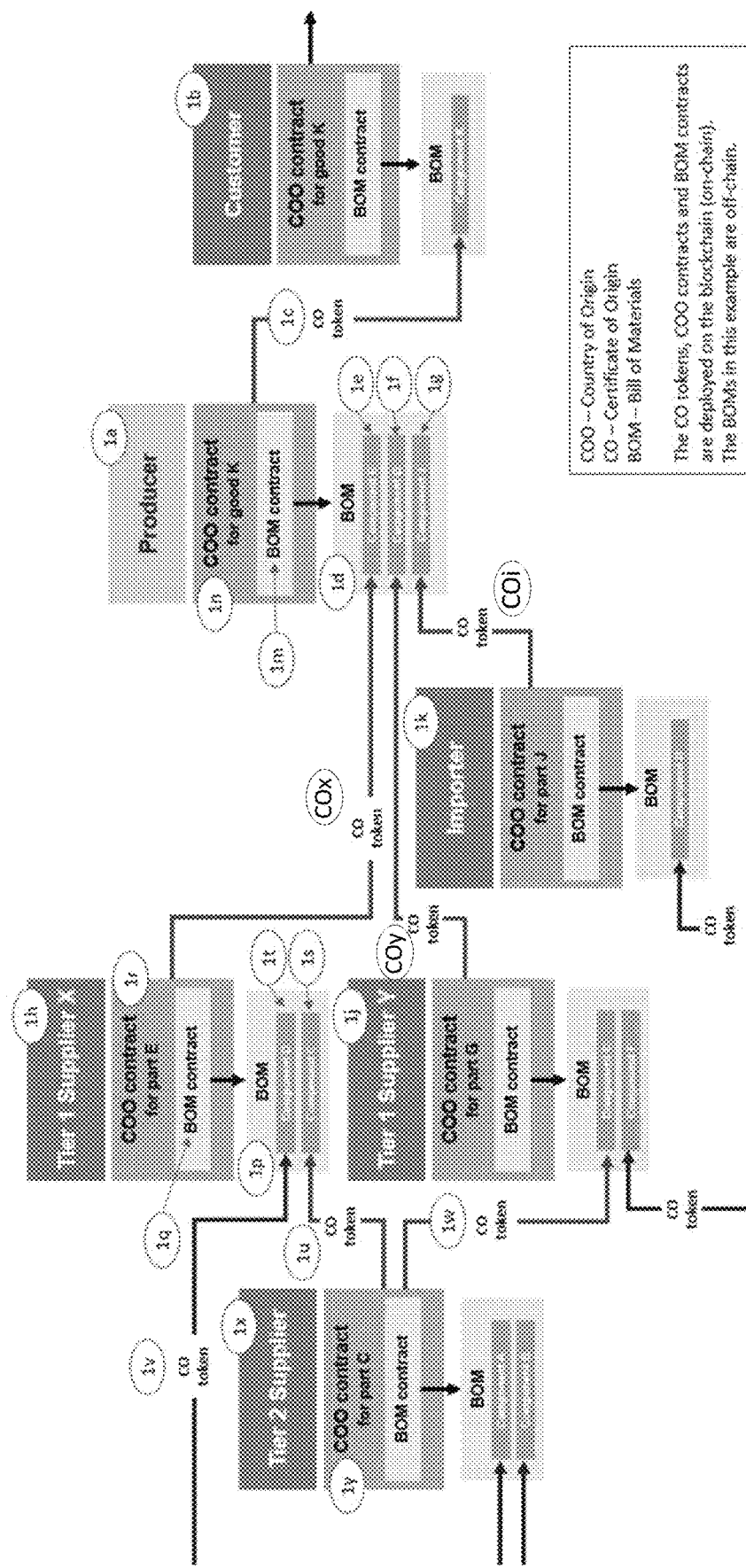
FIG. 3 is a flow diagram showing a multi-tiered supply chain use of COO contracts, BOM contracts, BOMs and CO tokens, according to some embodiments.

FIG. 3 is a flow diagram showing a multi-tiered supply chain use of COO contracts, BOM contracts, BOMs and CO tokens, according to some embodiments. In particular, FIG. 3 shows a process of resolving BOM dependencies with assertion tokens. The Producer (1a) of a Good K intends to issue a CO for this good for use by Customer (1b), to qualify the good under a trade program. For Producer (1a) to issue a CO assertion token (1c) to Customer, Producer (1a) creates a BOM (1d) for this good. The BOM (1d) specifies three components (1e, 1f, 1g) defining three dependencies on assertions that are used to issue a CO for this good under a given trade program. Component E (1e) specifies a dependency on a CO assertion token (COx) to be issued by Tier 1 Supplier X (1h) for Part E. Component G (1f) specifies a dependency on a CO assertion token (COy) to be issued by Tier 1 Supplier Y (1j) for Part G. Component J (1g) specifies a dependency on a CO assertion token (COi) to be issued by Importer (1k) for Part J. Once each of the dependencies of Components E, G and J has been satisfied, the CO assertion token (1c) can be issued. If one or more of the dependencies of Components E, G and J has not been satisfied, on the other hand, the CO assertion token (1c) is not issued (i.e., is prevented or precluded from being issued). In other words, the issuance of the CO assertion token (1c) is "gated" by the dependencies of Components E, G and J, which function as prerequisite events. The BOM (1d) is referenced by a BOM Contract (1m) deployed by Producer (1a) on the blockchain network. This BOM Contract (1m) is referenced by a COO Contract (1n) also deployed by Producer (1a) on the blockchain network. A CO assertion token (1c) can be issued based on COO Contract (1n) for use by Customer (1b) after the dependencies (1e, 1f, 1g) are resolved.

Tier 1 Supplier X (1h) has created a BOM (1p) for Part E, deployed a BOM contract (1q) that references this BOM (1p), and deployed a COO contract (1r) that references the BOM contract (1q). The dependencies for Component C (1s) specified in this BOM (1p) can be resolved, respectively, by CO assertion token (1u) for Part C issued by Tier 2 Supplier (1x) based on a COO contract (1y). The dependency on Component D (1t) can be resolved by a CO token (1v) issued by a party external to this diagram.

Tier 2 Supplier (1x) can also issue a different CO assertion token (1w) for the same Part C to Tier 1 Supplier Y (1j) based on the same COO Contract (1r). This illustrates the ability to issue separate CO assertion tokens to different customers for the same part based on the same COO contract.

Similar processes to those described above are shown in the FIG. 3 diagram to further illustrate this example, using a combination of BOMs, BOM contracts, COO contracts and CO assertion tokens. While this illustrative example focuses on the flow of CO assertion tokens to resolve component dependencies, other types of compliance declaration tokens can be used in addition to the CO assertion tokens to resolve additional dependencies requiring compliance declarations.

Managing the Use and Application of Assertion Tokens

In some embodiments, the assertion tokens of all types are "owned" and maintained at the level of the entity (e.g., producer or supplier) and are available to match against any component in any BOM. This allows a single assertion token to be matched and resolve multiple components in multiple BOMs, such that the matching criteria for a component of a given type is consistent across all BOM components for that entity. The requirement for consistency does not mean that all BOM components must share the same set of matching criteria, but any matching criteria used across multiple BOMs yields the same result of either "match" or "no match" when applied against any BOM component used by that entity.

Figure 4:
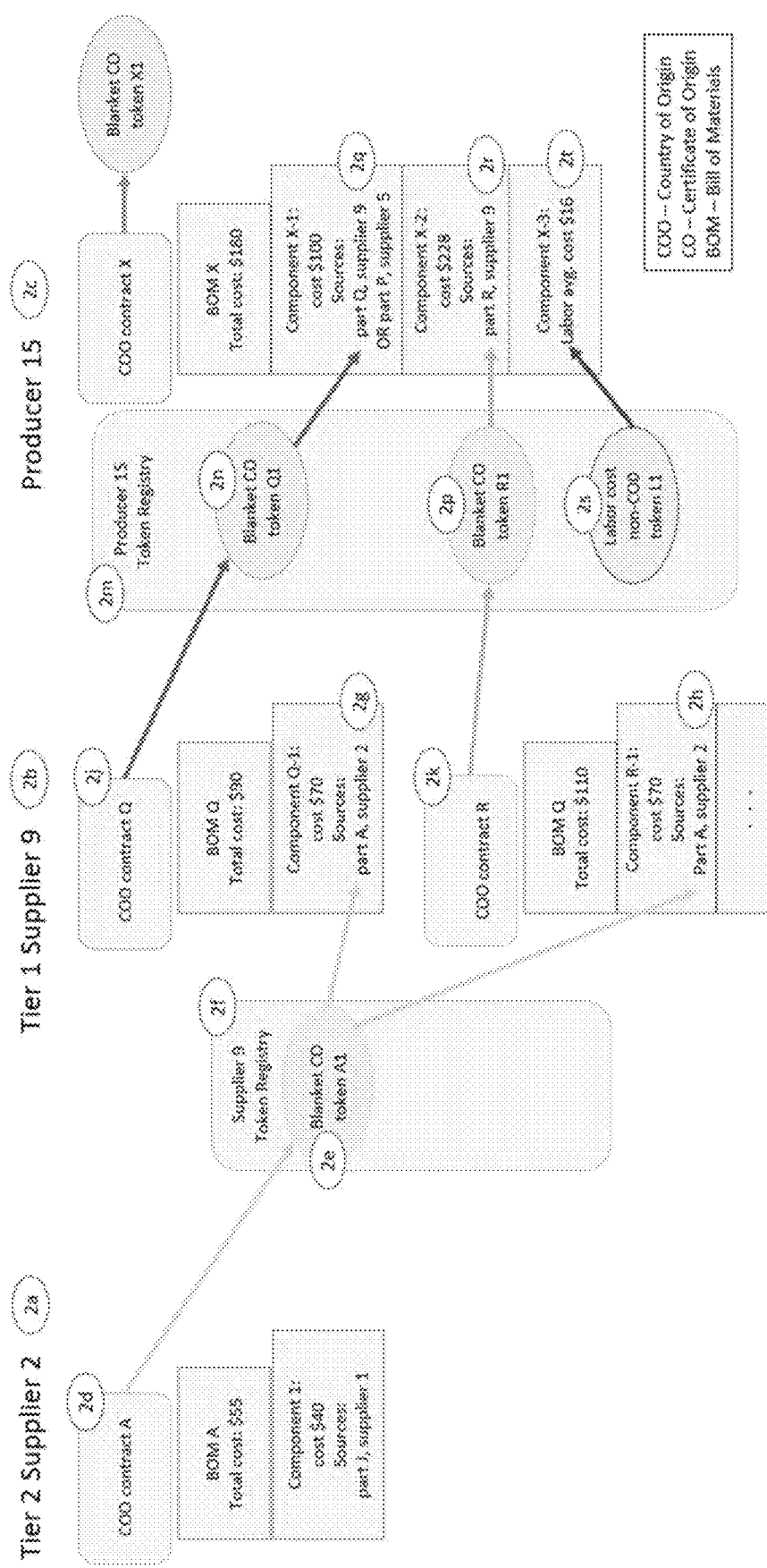
FIG. 4 is a flow diagram showing management of assertion tokens across multiple component dependencies in multiple BOMs, according to some embodiments.

FIG. 4 is a flow diagram showing management of assertion tokens across multiple component dependencies in multiple BOMs, according to some embodiments. More specifically, FIG. 4 is an illustrative example of "owning" and managing tokens at the level of an entity. In this example, Tier 2 Supplier 3 (2a) is supplying parts to Tier 1 Supplier 9 (2b), which in turn is supplying parts to Producer 15 (2c). Tier 2 Supplier 3 (2a) has deployed COO contract A (2d) to mint and transfer a blanket CO token A1 (2e). The CO token A1 (2e) is transferred to a Token Registry (2f) contract deployed by Tier 1 Supplier 9 (2b). The CO token A1 (2e) can be used to resolve the component dependency Q-1 (2g). The same CO token A1 can also be used to resolve the component dependency R-1 (2h). Both dependencies can be resolved by the same CO token, since the token is being kept at the level of the entity in a common Token Registry (2f).

Continuing with the example in FIG. 4, component dependency Q-1 (2g) is defined in the BOM referenced by COO contract Q (2j), and component dependency R-1 (2h) is defined in the BOM referenced by COO contract R (2k). Producer 15 (2c) has deployed its own Token Registry contract (2m). COO contract Q (2j) can be used to mint and transfer a blanket CO token Q1 (2n) to Producer 15's Token Registry contract (2m). Similarly, COO contract R (2k) can be used to mint and transfer a CO token R1 (2p). CO token Q1 (2n) can be used to resolve component dependency X-1 (2q), and CO token R1 (2p) can be used to resolve component dependency X-2 (2r).

The example in FIG. 4 also illustrates the use of a compliance declaration token (2s) that represents an assertion that the average labor cost in producing good X was at least $16/hour. This compliance declaration token can be used to resolve component dependency X-3 (2t). In this illustrative example, Producer 15 (2c) can generate the compliance declaration average labor cost token (2s) and store this token in its own Token Registry (2m). The same compliance declaration token (2s) can be used by Producer 15 (2c) to resolve component dependencies for other goods produced by Producer 15 (2c) when the same assertion about average labor costs apply. This type of compliance declaration token can be supported by on-chain or off-chain documentation such as general ledger data.

The mappings within a given entity between an identifier in an assertion token and the matching criteria of a BOM component can be unique for that entity, since the entity controls the mapping from asset token identifier to identifier used in its matching criteria. However, the identifiers in the assertion token are commonly interpreted across entities to transfer an asset token from one entity to the next and effectively use it to resolve a dependency in the entity receiving the assertion token. This implies that a common taxonomy of identifiers for an assertion token of a given type should be maintained across the entities that either generate a token with that assertion identifier or intend to use that token to resolve a dependency.

At a minimum, the commonality of assertion identifiers and assertion types are made between the party issuing the assertion token (producer) and the party receiving the assertion token (consumer) of any given assertion token, with either the producer or consumer or both providing the common mappings. In a broader set of implementations, where tokens of a given type are exchanged across multiple participants in the blockchain ecosystem, a shared taxonomy of assertion types and assertion identifiers enables the benefits of transferring an assertion token from one entity to the next without intermediate interpretations and mappings.

In some embodiments, a mechanism for managing a common taxonomy of assertion types and registering commonly used assertion identifiers is provided through one or more smart contracts deployed on the blockchain and acting as shared registries. A common taxonomy can be created within an implementation, and the common taxonomy can be updated and shared.

Rules for Resolving Dependencies

When considering the slots defined within an assertion contract, BOM contract or BOM, there is in practice considerable flexibility in defining the rules for resolving the dependencies implied by each slot and the rules for determining that a sufficient number of slots have been resolved to allow assertion tokens to be issued by the assertion contract.

In a simplified use case, every component dependency within a given BOM is considered independent, and every component in the BOM is resolved before the producer can generate (mint) its own assertion token based on a COO contract referencing that BOM (or referencing a BOM contract that in turn references that BOM). In this use case, every component is specifying a mandatory dependency, and all dependencies must be resolved to qualify the BOM for use in minting a CO token.

While this basic example helps to convey the overall concept, there can be a wide range of rules and conventions for components that define dependencies, rules to resolve a dependency, and rules to determine that an assertion contract is valid for issuing tokens. Within a given product category or supply chain, the practical application of contracts and tokens can be facilitated by establishing a common set of definitions and rules.

One important consideration is that the slots and the rules for resolving their dependencies only need to cover the minimum requirements to support the assertion being made. As described in an example above, to support a COO assertion that 70% of the value of a product comes from parts with origins from a given set of countries, slots only need to be defined for those parts that constitute at least 70% of the value of the product. There may be hundreds of smaller parts that don't contribute to the 70% threshold and therefore do not need to be specified as slots in the COO contract, BOM contract or BOM. In this example, a total cost or total value can be specified in either the BOM contract or COO contract, to validate that the threshold has been met.

In general, the slots defined for a COO contract, BOM contract or BOM can represent a subset of the parts listed in corresponding production BOM(s) used to support the actual manufacturing process. This greatly reduces the administrative and processing burden in defining a COO or BOM contract, issuing tokens, and resolving the dependencies in any given assertion contract.

For compliance declaration contracts, similar simplifications can be made. For example, an assertion about average wages in the labor content of a part can be limited to only satisfy the specific requirements defined in the trade agreement being applied.

As previously described, an assertion token can include attributes that are themselves assertions ("assertion attributes"). These assertion attributes are typically of a different assertion type from the primary assertion being made, such as an assertion about the labor content of a part as an attribute of an assertion about the Country of Origin of that part. Similarly, the matching criteria for a component of a given type can specify one or more specified assertion attributes that are present in an assertion token being matched. In this way, the matching criteria are conditional on the token also having the specified assertion attributes.

There can be more elaborate rules for qualifying a BOM for use in a COO contract to generate a CO token. These rules could be specified either at the level of the BOM, or the level of the BOM contract, or the level of the COO contract. In one embodiment, the rules would be implemented through software functions specified in the COO contract or BOM contract, to increase the level of confidence among participants in the blockchain ecosystem that the rules have been correctly applied. Alternatively, the qualification rules could be computed outside of the blockchain, with the result recorded in an appropriate blockchain transaction.

"Bootstrap" Assertion Contracts

Since the transfer and usage of assertion tokens can be conceptualized as a recursive process across a multi-tier supply chain, this leads to the question of how to "bootstrap" a recursive process when assertion tokens are not being produced at a lower tier of the supply chain. Methods set forth herein can facilitate the creation of an assertion contract that has no references to a BOM contract and no slots, and therefore can issue tokens without needing to resolve those slots through tokens issued at a lower level.

These "bootstrap" contracts, and the tokens generated from these contracts, do not have supporting blockchain smart contracts or tokens at a lower level of the supply chain, and are therefore considered less reliable than contracts and tokens supported by on-chain COO contracts, non-COO contracts, BOM contracts or assertion tokens at a lower level. But they are used to support common use cases such as products created from raw materials, or representing goods from suppliers that are not yet accessing a distributed ledger within a given set of implementations.

A supplier can create this type of bootstrap assertion contract, or a customer can create such a contract as a proxy for a given supplier. The level of confidence in such an assertion contract, and consequently the level of confidence in the tokens generated by such an assertion contract, should in practice be considered substantially lower than those contracts and tokens backed by tokens issued at the lower level. The level of confidence should be considered even lower when a producer is creating the contract and related tokens as a proxy for the supplier.

Referring to FIG. 3, the CO token ($1v$) used to resolve the component D ($1t$) dependency can be considered an example of a "bootstrap" token if it was minted by a COO contract with no supporting BOM contract or BOM.

Tracing the Flow of Assertion Tokens

In a multi-tier supply chain, the cascading set of dependencies starting with a COO contract at any tier of the chain can be considered to define a virtual dependency graph, where the dependencies are resolved through assertion tokens generated at each successive lower tier. When auditing the validity of an assertion token such as a CO token, the history of transactions recorded immutably on the blockchain provides the ability to trace back through the dependencies and review the on-chain transactions that generated the tokens being used to resolve each dependency, along with any supporting documents referenced by those transactions.

The ability to treat each assertion token as the root of a virtual dependency graph of prior related assertions, all recorded as immutable blockchain transactions, provides unique insights into a process of declaring and proving the origin of a good. Today this process is both opaque and dominated by paper, and the difficulty of tracing dependent origin claims greatly increases across each successive step in a supply chain. From the viewpoint of a producer trying to assure they are making valid claims for preferential or non-preferential treatment, or an auditor or customs authority attempting to verify these claims, a common distributed ledger of tokenized COOs qualitatively changes the way these functions are currently performed.

From the perspective of algorithmic efficiency, the transfer of assertion tokens allows each supplier or producer to independently determine the validity of making their own COO assertions based on their "ownership" of the tokens. This makes each decision point in the supply chain to create an assertion token both discrete and independent, without needing to dynamically query the state of COO or BOM contracts that were the source of the tokens being used. Computations or processing to support a decision to issue an assertion token can all be done locally within the domain of the supplier or manufacturer making that decision, since the dependencies have been tokenized and transferred in prior transactions on the blockchain.

In addition, the smart contracts that govern these transactions support a use case where the expiration or invalidation of an assertion token at a lower level can prevent the generation of any new tokens from an assertion contract at a higher tier that now has an unmet dependency. Because every node in the blockchain carries its own copy of the entire state of the blockchain, a transaction to invalidate or expire an existing assertion token will be reflected at all nodes after the transaction has been recorded into a block.

The detection of an unmet dependency can be used to either manually or automatically initiate a request for a new valid token, where the request can be sent either through an on-chain transaction or through an off-chain secure message. The party receiving the request can generate a new and valid assertion token to effectively replace the invalidated or expired token. Another supported use case is to query the state of the blockchain to determine if a COO contract exists that meets certain criteria, and then manually or automatically request a CO token based on this COO contract. The query can be assisted through the use of events generated by blockchain transactions, where an event includes metadata to support such a query.

Illustrative Example of Requesting and Receiving a CO Token

Figure 5:
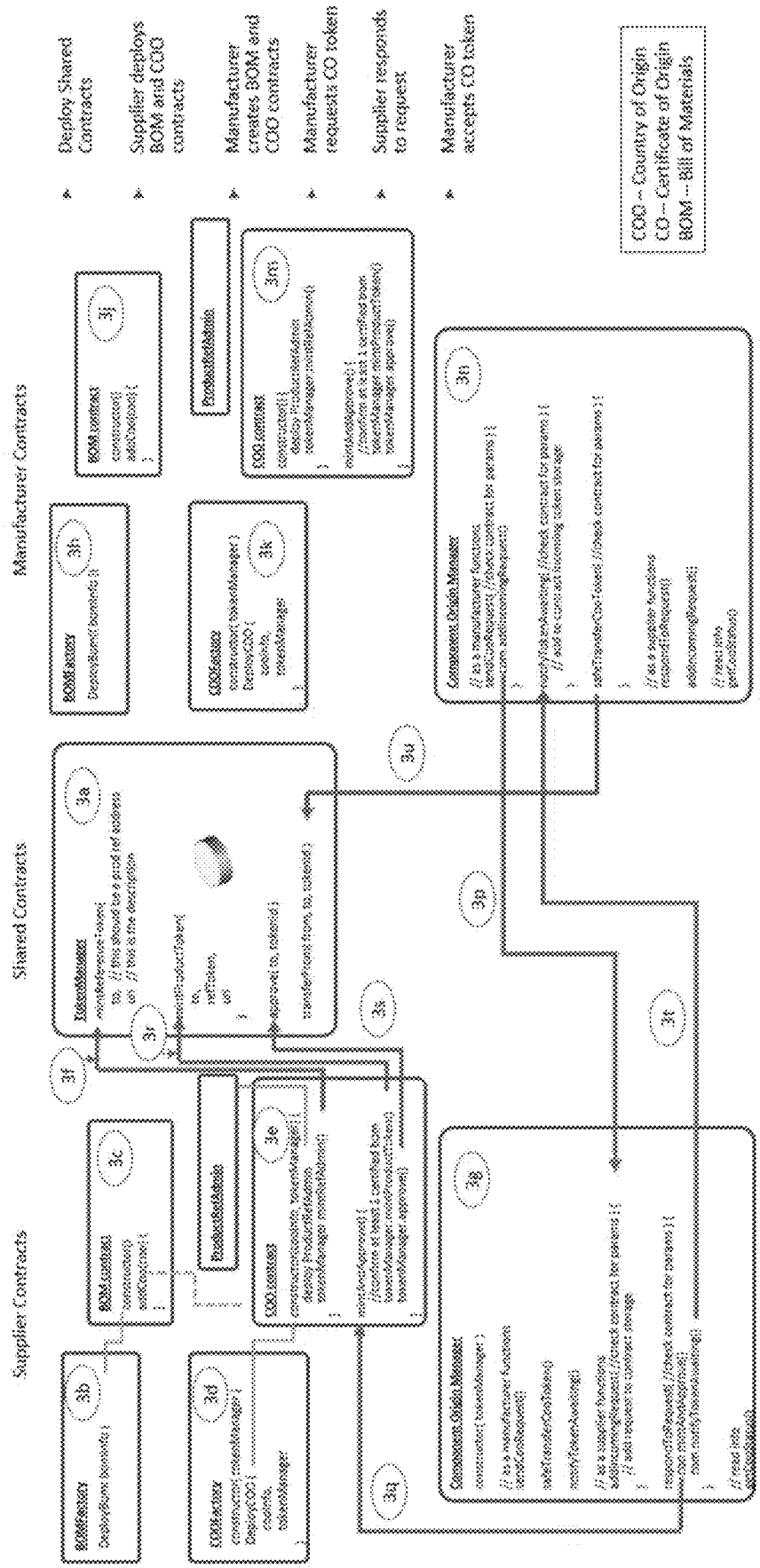
FIG. 5 is a flow diagram showing the processing of requests for CO tokens, according to some embodiments.

FIG. 5 is a flow diagram showing the processing of requests for CO tokens, according to some embodiments. More specifically, FIG. 5 is an illustrative example of the process of requesting and receiving a CO token. This example outlines aspects of implementing this process using an Ethereum blockchain network. An initial step in this process is to deploy shared contracts including a Token Manager (3a) for minting and transferring assertion tokens. The supplier can use a deployed BOMFactory smart contract (3b) to create a BOM Contract (3c) for the given part. The supplier can also use a deployed COOFactory (3d) smart contract to create a COO Contract (3e) that references the BOM Contract (3c).

In this example, as part of deploying the COO Contract (3e), the contract's constructor method can invoke a method on the Token Manager (3a) to mint a Product Reference Token (3f). The Product Reference Token (3f) becomes a template to generate assertion tokens based on the COO Contract (3e). The supplier's Component Origin Manager (3g) provides methods to handle and respond to incoming requests, and functions to receive assertion tokens generated by upstream suppliers. This Component Origin Manager (3g) is similar in function to the Token Registry (2f) described in FIG. 4.

The Manufacturer in this example that will request the CO token from the supplier can use a BOMFactory smart contract (3h) to deploy a BOM Contract (3j), and use a COOFactory smart contract (3k) to deploy a COO Contract (3m). These steps can happen either before or after requesting the CO token from the Supplier.

Continuing with the example, the Component Origin Manager smart contract (3n) deployed by the Manufacturer can invoke a method to add a request for a CO token (3p) from the Supplier. This Supplier can respond to the request by invoking a method on the COO Contract (3e) to mint a CO token (3q). This COO Contract method will in turn invoke a method on the Token Manager (3a) to mint a CO token (3r) and then invoke a method (3s) on the Token Manager to approve the transfer of that Token to the requesting Manufacturer. The Manufacturer can then receive this CO token by invoking a transfer method (3u) on the Token Manager to transfer that CO token from the Supplier to the Manufacturer.

While this example provides a set of smart contracts, methods, and steps, there are a number of alternative formulations and processing steps that can provide similar or equivalent functionality. In particular, there can be considerable variation in the order in which smart contacts are deployed to achieve the same or similar outcomes.

Coordinating Off-Chain Data and Processes with On-Chain Activities

External documents such as BOMs, purchase orders, invoices, customs import and export documents, hard copy certificates of origin, pictures and images of goods, schematics, production flow diagrams and shipping documents can be used as evidence to support the assertions represented by the assertion tokens or used as evidence to support the information contained in assertion contracts or BOM contracts. Common techniques such as those described below for linking these external documents to the on-chain transactions, contracts and tokens can also be incorporated.

BOM contracts, assertion contracts and assertion tokens can also include references to data elements such as general ledger or to external data streams, such as those generated by Internet of Things (IOT) devices, Global Positioning Satellite (GPS) data, or other means of tracking the location or environmental conditions (such as temperature) associated with the transport of a good.

Documents, data elements and data streams associated with a blockchain transaction, contract or token can be stored outside the blockchain ("off-chain") and referenced on the blockchain by providing a locator such as a universal resource identifier (URI) and cryptographic hash of the relevant contents. The locator provides a unique identifier that can be used to request an electronic copy of the document, data elements or data stream.

A cryptographic hash can be computed from a scanned image of an original document, or from an electronic form, or from the contents of a set of data elements or data stream. The cryptographic hash is used to verify that the retrieved copy of the relevant content is identical to the original that was referenced in the blockchain transaction. In addition, the digital representation of the document, data elements or data stream can include one or more digital signatures used to validate the provenance of the document.

References with locators, cryptographic hashes, or digital signatures can be used in a validation process before issuing an assertion token, or in a third party certification process applied to an assertion contract or assertion token (as described below), or in an auditing process reviewing at a later time the validity of a given assertion token, assertion contract or BOM contract.

Data and documents stored on the blockchain ("on-chain") are inherently more verifiable by every participant in the blockchain network, but at the cost of having every node on the network store a copy of the data or document. There are also privacy and confidentiality considerations when data or documents are permanently stored on every node participating in the blockchain network.

In some embodiments, a complementary secure messaging facility can support off-chain exchange of encrypted confidential documents. This allows secure document exchange without memorializing the contents of the document in permanent blockchain storage.

Similarly, processing functions done on the blockchain ("on-chain") are inherently more verifiable by every participant in the blockchain network, but at the cost of having every node on the network perform the same processing functions and store the data used as inputs to the processing function. Off-chain processing cannot be directly verified by another node, but off-chain processing lowers the overall processing load of the network while also preserving the confidentiality of the data being used within that processing function.

There can also be different versions of the same document or data stream stored either on-chain or off-chain, where certain confidential or sensitive data elements (such as the price, cost, and supplier contact information for a BOM component) are masked or removed from a version derived from the original. Digital signatures and cryptographic hashes can be used to link together the derived versions with the original.

Each decision to store data or documents either on-chain or off-chain, or to use either on-chain or off-chain processing for a given function and its data inputs, can be treated as a cost/benefit trade-off applicable to a specific use case. One set of trade-offs can be applied to one use case, while another use case will be better implemented with a different set of trade-offs.

In addition, within a single use case there may be participants that can provide higher levels of on-chain data or be capable of providing and executing more extensive on-chain processing algorithms. These higher levels of on-chain capabilities can support higher levels of trust in the assertion tokens being generated.

Zero-Knowledge Proof (ZKP) Technology

Certain needs for privacy and confidentiality of commercially sensitive transactions can be met through the use of zero-knowledge proof (ZKP) technology. ZKP can allow transactions to be securely recorded on the blockchain without revealing either the parties to the transactions or the value or assets being exchanged (i.e., transaction details can be hidden). At the same time, ZKP technology provides cryptographic proof that an exchange of assertions through token transfer was properly made, that the tokenized assertion was transferred, and the receiving party has legitimate "ownership" of the transferred token.

For example, ZKP technology can provide cryptographic proof that an assertion token was minted by Party A, and transferred from Party A to Party B, without revealing the identities of either Party A or Party B to a third party inspecting the recorded blockchain transactions. There is also the potential to use ZKP technology as a way of proving that a derived version of a document, data set or data stream has been properly derived from the original.

In a blockchain supporting a system of multiple entities, where confidentiality of the transacting parties and the items being transacted is important, ZKP becomes a key enabling technology for embodiments set forth herein.

Third Party Certification

A separate but related concept is the issuance of a third-party certification to an assertion contract, assertion token or BOM contract. This certifies the validity of the contract or token by an independent third party such as an auditor, law firm, licensed customs broker, recognized industry expert, customs authority or other government agency, or other government authorized entities such as local chambers of commerce.

This is intended to increase the confidence in the assertion represented by either the given token, or all tokens issued against a given contract within the stated period and other stated boundaries of the certification.

In some countries, a paper CO must be certified by an authorized agent (such as a local chamber of commerce), government agency (e.g., food and drug administration) or customs authority to be considered valid. In such instances, embodiments set forth herein can support a similar workflow with a digital certification applied to an assertion contract or assertion token. A test for the validity of the assertion token or assertion contract can be made contingent on the presence of the certification(s).

A workflow to support a certification process can be supported by providing a certifying party access to the blockchain-based system described herein. A request for certification can be routed through a blockchain transaction or secure messaging system, or through other means of communication between the parties. Requests from the certifying party for documentation to support the certification process can be routed through similar means. Documentation can include on-chain assertion tokens, assertion contracts and BOM contracts in addition to off-chain documents. BOMs referenced by these contracts can also be requested as documentation, with the BOMs either on-chain or off-chain.

In a certification process, BOMs are an important source of information to validate the claims represented by a COO contract or CO token. If the BOM is off-chain, a copy of the BOM can be transmitted to the certifying party. If any components of the BOM reference a CO token from a supplier, and the certifying party desires another level of information to complete the certification process, the certifying party can make a further request to that supplier for its documentation. This process can continue back through multiple tiers of the supply chain, if available and if needed.

Each CO token referenced by a BOM can be verified against the blockchain transactions that minted and transferred that CO token. When ZKP technology is used to implement the token transfer, the certifying authority can request the desired information from the transacting parties to inspect and verify the appropriate transactions in the blockchain record.

Once the certification process has been successfully completed, the certifying party can issue a blockchain transaction to apply the certification to the contract or token being certified. There can be multiple types of certifications that can be applied to a given contract or token. For example, a certification by a third-party expert can be issued separately from a certification by a party authorized by a government agency.

A certification process can include certification of an assertion contract as a pre-condition for issuing any tokens based on that contract, followed by a separate certification of each assertion token that is issued based on that contract. This type of certification process allows for a periodic review of the documentation (such as the BOM) supporting the assertion contract, makes issuance of an assertion token contingent on certification of the assertion contract, and provides for a separate certification of those assertion tokens. This is analogous to current paper-based processes where a periodic review of documentation is desired, and paper COs for each shipment must be separately approved with reference to the certification issued through the periodic review.

It is also possible to have the certifying party act as an intermediary in the transfer of an assertion token. In this configuration, an assertion token to be certified can be transferred to the certifying party as an intermediate step in the transfer process. After certification is complete, the certifying process can transfer the token to the intended recipient of the token.

Auditing

A customs authority, third party expert or other authorized party can conduct an audit of a CO token, compliance declaration token or the supporting smart contracts or documentation (including off-chain documentation such as an off-chain BOM). Similar processes to those described above for certification are applicable to an auditing process. The key difference is that certification is typically done in advance or during the period that an assertion token is applicable, while an audit is typically done at a later time.

A certification can be used as an input to a decision on the level of confidence to assign to an assertion contract or assertion token or taken into account when considering whether the contract or token is valid. An audit can be used to ascertain if the basis for a certification, assertion contract or assertion token was appropriate and met applicable regulatory or contractual obligations.

As with certification, an audit process can trace back through multiple levels of a supply chain or production process by inspecting the flow of assertion tokens that were used to resolve component dependencies at each step in a supply chain or production process.

Correlating Origin Token Flow to Related Production Processes

While core functions of embodiments of the present disclosure can include the generation and use of tokenized assertions to qualify for preferential or non-preferential duties or tariff treatment, complementary supply chain operations can coexist on the same blockchain network and integrate with both the on-chain and off-chain capabilities described herein. Such complementary functions can include tracking and tracing product shipments (track-and-trace), purchase order and invoice functions, and payment functions. As more aspects of a supply chain are implemented and integrated on the same blockchain network or coordinated across multiple blockchain networks, the value of the integrated solution increases to all participants.

The assertion tokens described herein, and the associated blockchain transactions, can co-exist with tokens and transactions performing the other related supply chain functions. References to the related transactions and tokens can be made within an assertion contract, token or transaction. Similarly, the contracts, tokens or transactions for other related supply chain functions (such as product track-and-trace) can include references to assertion contracts, tokens or transactions.

References across tokens, contracts or transactions of different types on the same blockchain can support either loose coupling or tight coupling between these related processes. In a tightly coupled embodiment, the assertion tokens are directly generated as a by-product of a production process and then directly consumed as inputs to one or more downstream production processes. In a more loosely coupled embodiment, the administrative processes and related blockchain transactions to generate and consume assertion tokens are done in parallel with transactions supporting the production process, and only references are maintained between one and the other without fully integrating the related processes on the blockchain.

Illustrative Examples of Correlating Token Flow to Related Production Processes

Figure 6:
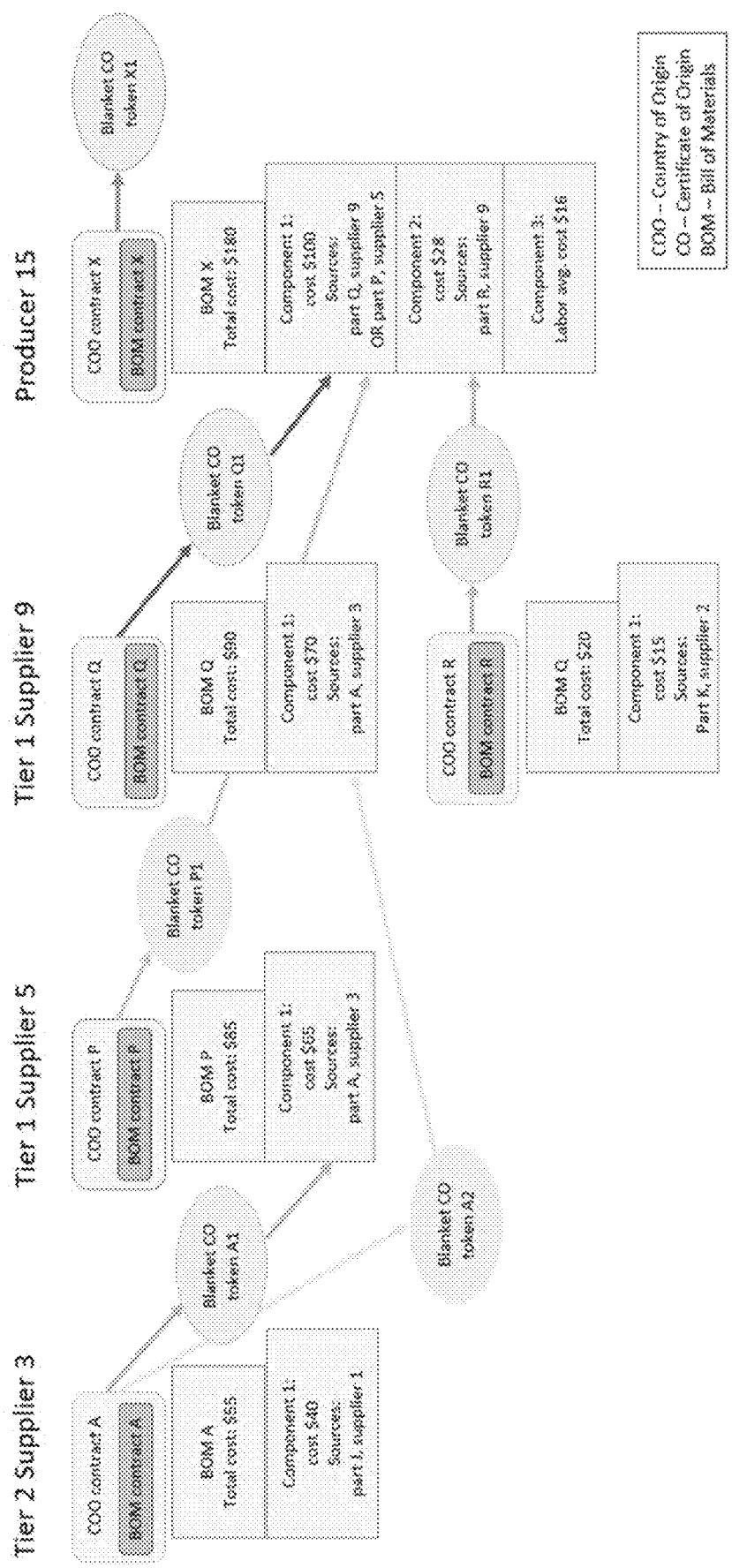
FIG. 6 is a flow diagram showing resolution of multi-tier COO dependencies through blanket CO token transfers, according to some embodiments.

To illustrate the different types of ways to correlate assertion token flow with related production processes, a set of examples are presented in FIGS. 6, 7, 8 and 9. FIG. 6 is a flow diagram showing resolution of multi-tier COO dependencies through blanket CO token transfers, according to some embodiments. More specifically, FIG. 6 is an illustrative example of using blanket CO tokens without any direct or indirect references to on-going production processes. As such, FIG. 6 is quite similar to FIG. 3 and therefore will not be described in detail. FIG. 6 is used as a baseline for describing increasing levels of integration illustrated in FIGS. 7, 8 and 9.

Figure 7:
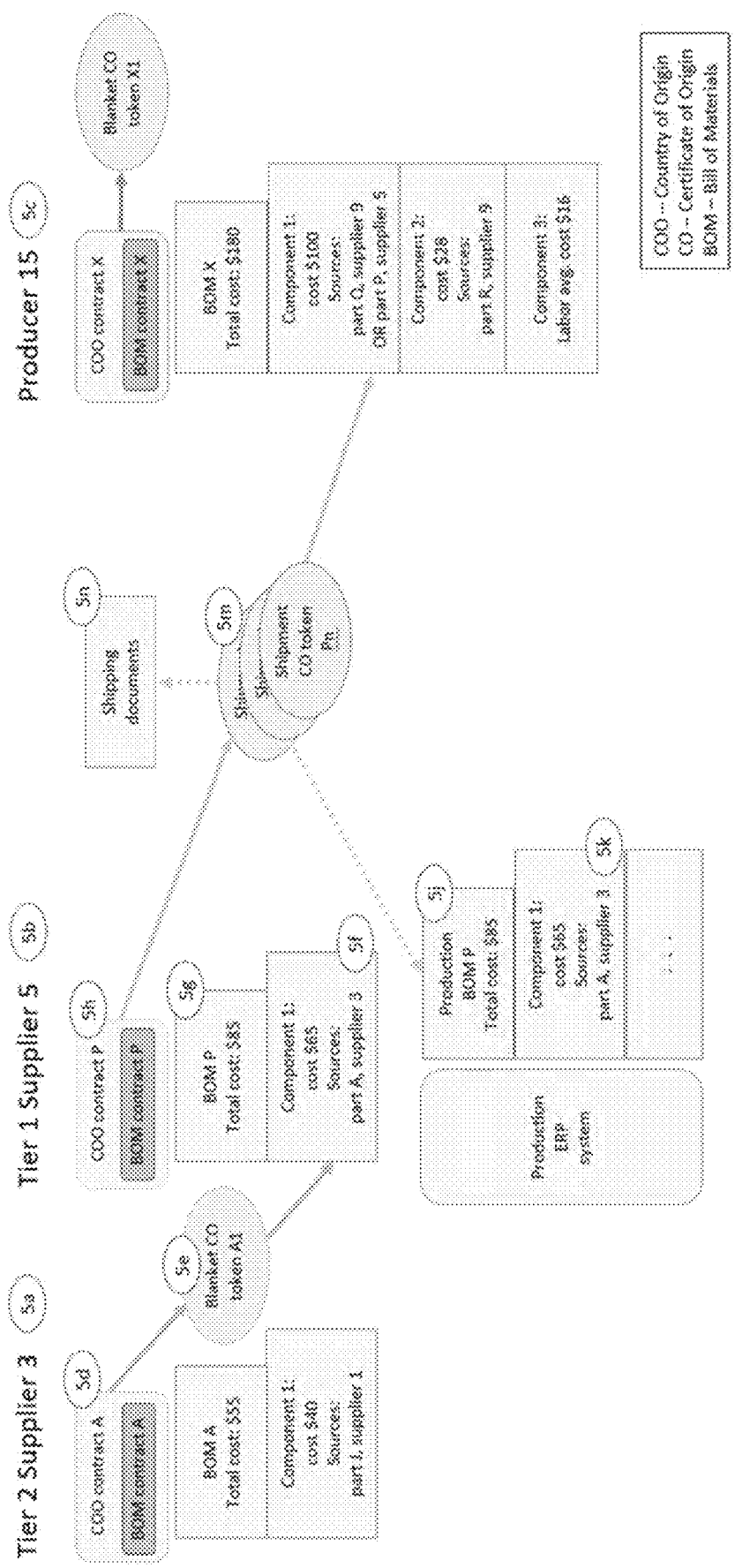
FIG. 7 is a flow diagram showing shipment CO tokens, used as a bridge to integration with production processes, according to some embodiments.

FIG. 7 is a flow diagram showing shipment CO tokens, used as a bridge to integration with production processes, according to some embodiments. More specifically, FIG. 7 illustrates the use by one supplier of shipment CO tokens, in addition to or as a substitute for the use of blanket tokens by that supplier. This illustrative example has a Tier 2 Supplier 3 (5*a*), a Tier 1 Supplier 5 (5*b*) and a Producer 15 (5*c*). As in FIG. 6, both Tier 2 Supplier 3 (5*a*) and Producer 15 (5*c*) continue to use blanket CO tokens.

In the illustrative example of FIG. 7, Tier 2 Supplier 3 (5*a*) can deploy COO contract A (5*d*) to mint a blanket CO token A1 (5*e*). This CO token (5*e*) can be used to resolve Component 1 dependency (5*f*) in Tier 1 Supplier 5's BOM for part P (5*g*), and that BOM (5*g*) can be referenced by a BOM contract P referenced by COO contract P (5*h*).

Continuing with FIG. 7, when Tier 1 Supplier 5 (5*b*) manufactures part P, the Tier 1 Supplier 5 (5*b*) (e.g., via a production ERP system) maintains a production BOM (5*j*) for part P, a detailed list of all parts required to manufacture part P. This production BOM (5*j*) is closely related to the BOM (5*g*) referenced in the COO contract (5*h*) used for minting CO tokens, but is not necessarily exactly the same, since the BOM for the COO (5*g*) can be a partial BOM while the production BOM (5*j*) can have a more detailed list of components. In this example, the production BOM also has a Component 1 (5*k*) corresponding to Component 1 (5*f*) used in the COO process but also has additional components.

In FIG. 7, for each shipment of part P a new shipment CO token (5*m*) is minted and transferred for use by Producer 15 (5*c*). The off-chain coordination for the process of minting a shipment CO token (5*m*) for each shipment can be managed through Tier 1 Supplier 5's shipping department. The relevant shipping documents (5*n*) can be referenced by each corresponding shipment CO token (5*m*), and each shipment CO (5*m*) can reference the corresponding production BOM (5*j*) using previously describe techniques for referencing off-chain documentation. The process illustrated in FIG. 7 is analogous to a manual or automated process of copying a paper-based CO and attaching it to each shipment.

Since shipment COs are generated with more frequency than blanket COs and can reference additional documentation, they can be considered to provide a higher level of confidence in the assertions represented by the shipment COs. Shipment COs can also be subject to a certification process that applies to each shipment, which can provide a higher level of confidence in the assertion, compared to a certification over a blanket period.

Figure 8:
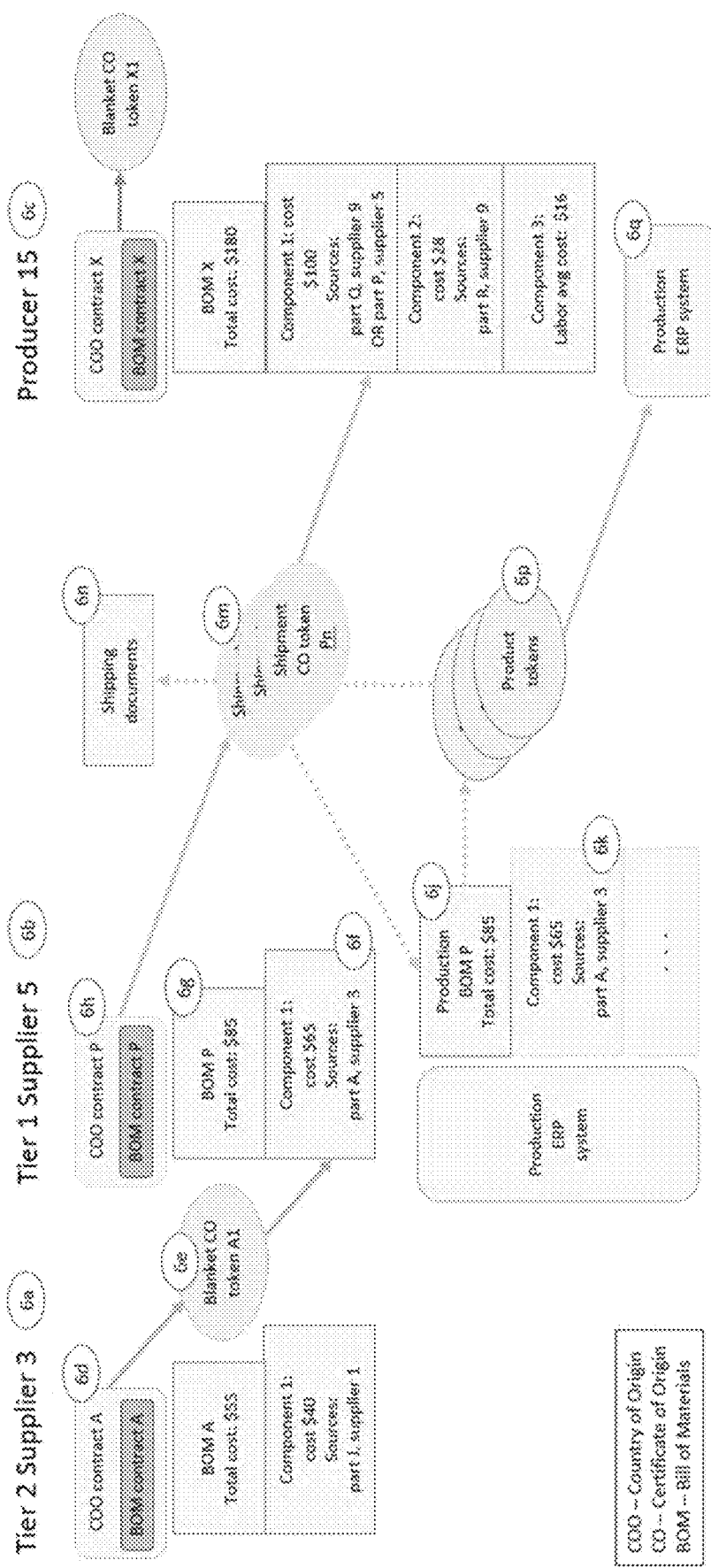
FIG. 8 is a flow diagram showing integration of shipment COs with supply chain ("track and trace"), according to some embodiments.

FIG. 8 is a flow diagram showing integration of shipment COs with a supply chain ("track and trace"), according to some embodiments. More specifically, FIG. 8 is an illustrative example of a further level of integration between the CO and production process. The example in FIG. 8 builds on the example of FIG. 7, and the descriptions of 6*a* through 6*n* are the same. The difference in FIG. 8 is the introduction of a blockchain-based production system that mints product tokens (6*p*) during the production process. Each product token (6*p*) represents a single part P that has been produced by Tier 1 Supplier 5, and each product token (6*p*) can be transferred to Producer 15 for use in Producer 15's production system (6*q*). Depending on the production process, multiple parts can be grouped together into a single shipment. Each shipment can be referenced in the corresponding shipment CO token (6m).

The example in FIG. 8 illustrates a loosely coupled coordination between two related blockchain systems, the system for generating and transferring CO tokens and the separate but related system for generating and transferring product tokens.

Figure 9:
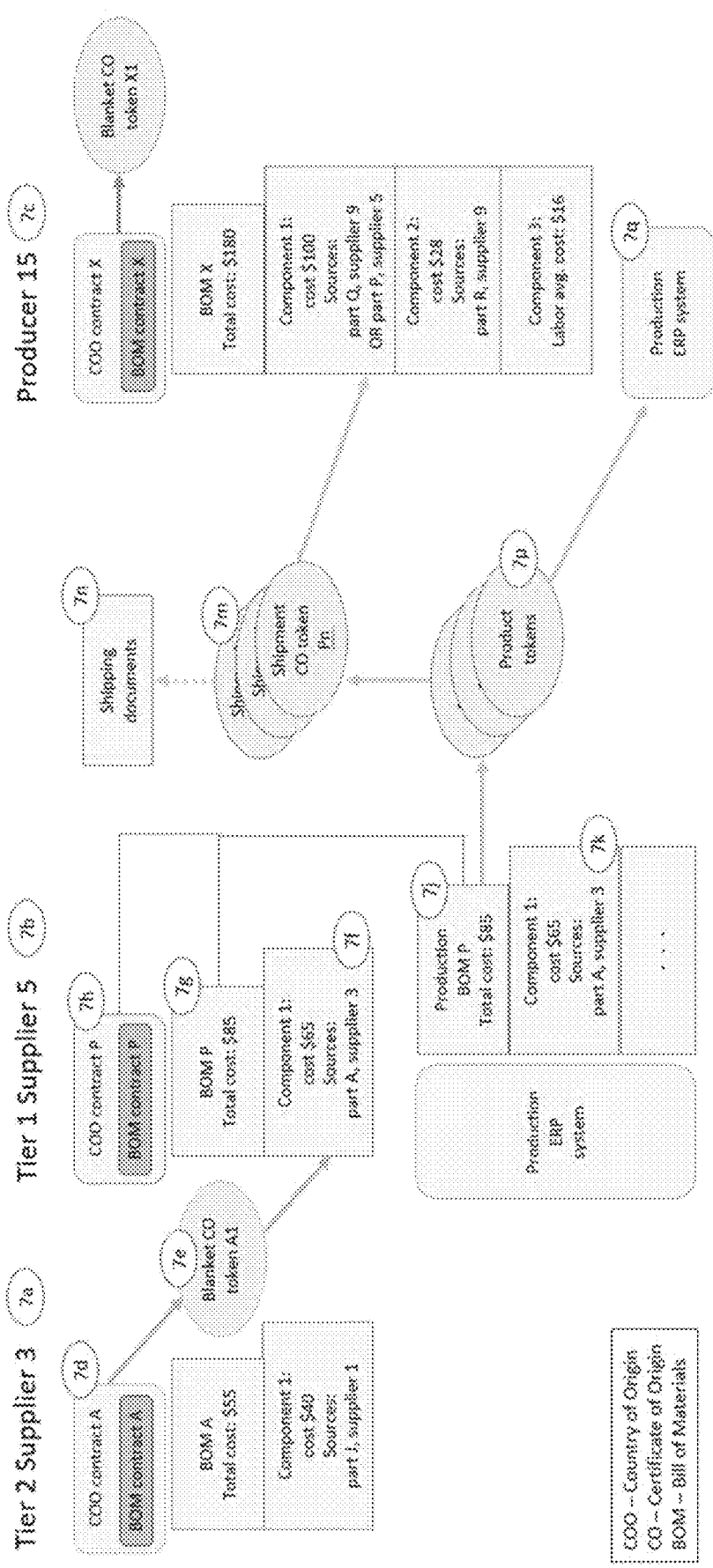
FIG. 9 is a flow diagram showing a method of automatically deriving shipment COs from tokenized supply chain data, according to some embodiments.

FIG. 9 is a flow diagram showing a method of automatically deriving shipment COs from tokenized supply chain data, according to some embodiments. More specifically, FIG. 9 is an illustrative example of a more tightly coupled coordination between the CO tokens and the production process. The descriptions for 7a through 7k is the same as in FIG. 8. The difference is that the data in the BOM (7g) used in the CO process is directly accessed by the production ERP system and synchronized with the corresponding production BOM (7j). In this way, the same production process creating the product tokens (7p) can be used to directly generate the shipment CO tokens (7m) with the production system having direct access to both the production process and the COO contract (7h) for part P.

According to some embodiments of the Global Trade Origin blockchain platform set forth herein, importers and exporters can assert the country of origin of goods on a shared, distributed ledger. Parties in the network can "look down" the chain of suppliers to collect sufficient evidence to qualify their goods for preferential- and non-preferential duty-saving programs worldwide. According to methods set forth herein, a tamper-proof record of origin transactions can be produced and maintained, and smart contracts can be used to manage origin information, thereby increasing trust in supplier data and improving transparency across supply chains. In addition, in some embodiments, CO tokens can be inspected upon the transmission of associated messages within a telecommunications network, at one, multiple, or all steps within a supply chain process. The CO token inspection process can result in a validation of the CO token, in which case the CO token can be accepted or rejected for use in further transmission and/or transaction, or in a determination that the CO token (or a portion of the data of the CO token) is not valid, in which case the CO token is rejected from use for further transmission or transaction. The rejection of a CO token can also trigger the generation and transmission of one or more alert messages, as discussed above.

Efficient Process for Compliance with Rules of Origin

In some embodiments of the Global Trade Origin blockchain platform, counterparties (e.g., importers, producers, etc.) can efficiently request COs from suppliers. Suppliers can easily enter origin details (e.g., Bills of Materials and supporting documentation) in the system once, and transfer COs to all their customers in the same format. The efficient exchange of information on the Origin blockchain is expected to lower the cost of FTA compliance significantly and reduce the need for manual reconciliation and duplicative data entry.

Contrary to a typical supply chain solution, no need exists to collect evidence on all parts of a good on the Global Trade Origin blockchain, according to one or more embodiments discussed herein. Parties may collect evidence on the components that contribute to the specific rule of origin criteria.

Lower Error Rate and Penalty Risk

Embodiments of the Global Trade Origin blockchain platform can significantly reduce the risk of invalid claims and penalties, as smart contracts manage the creation and exchange of COs at every stage of the production process. The system also facilitates immediate notification of changes in the origin of goods to all downstream producers and importers, preventing origin claims based on outdated information. As the system leverages blockchain technology, transactions recording origin details cannot be altered once they are stored on the shared, immutable ledger. This feature increases trust in supplier data for both counterparties (e.g. importers, producers, etc.) as well as for customs agencies. In addition, one or more embodiments of the platform described herein allow independent third parties specializing in complex rules of origin determinations to review and certify the origin claims on the blockchain ledger, providing an even higher level of trust.

Full Confidentiality

In some embodiments, only "hashes" (digital fingerprints) of sensitive information are stored on the blockchain ledger, thereby achieving full confidentiality. Access to documentation and sensitive data (e.g., component prices in a Bill of Materials) can be limited to certain authorized stakeholders. This feature gives parties the ability to efficiently share information about the origin of a good, while keeping the competitive margin and sourcing information private. When customs authorities audit an import, they quickly can be granted access to the underlying data necessary to support a preferential or non-preferential origin claim.

Transparency and Modeling Opportunities

As COs are stored on a shared blockchain ledger, the solution enables real-time analysis of supplier COs, which increases the transparency in the supply chain. In addition, the solution has a structured CO format for declaring origin (with tailored fields per FTA), which enables insights in origin qualification across free trade agreements. This is expected to significantly increase free trade agreement utilization.

Figure 12:
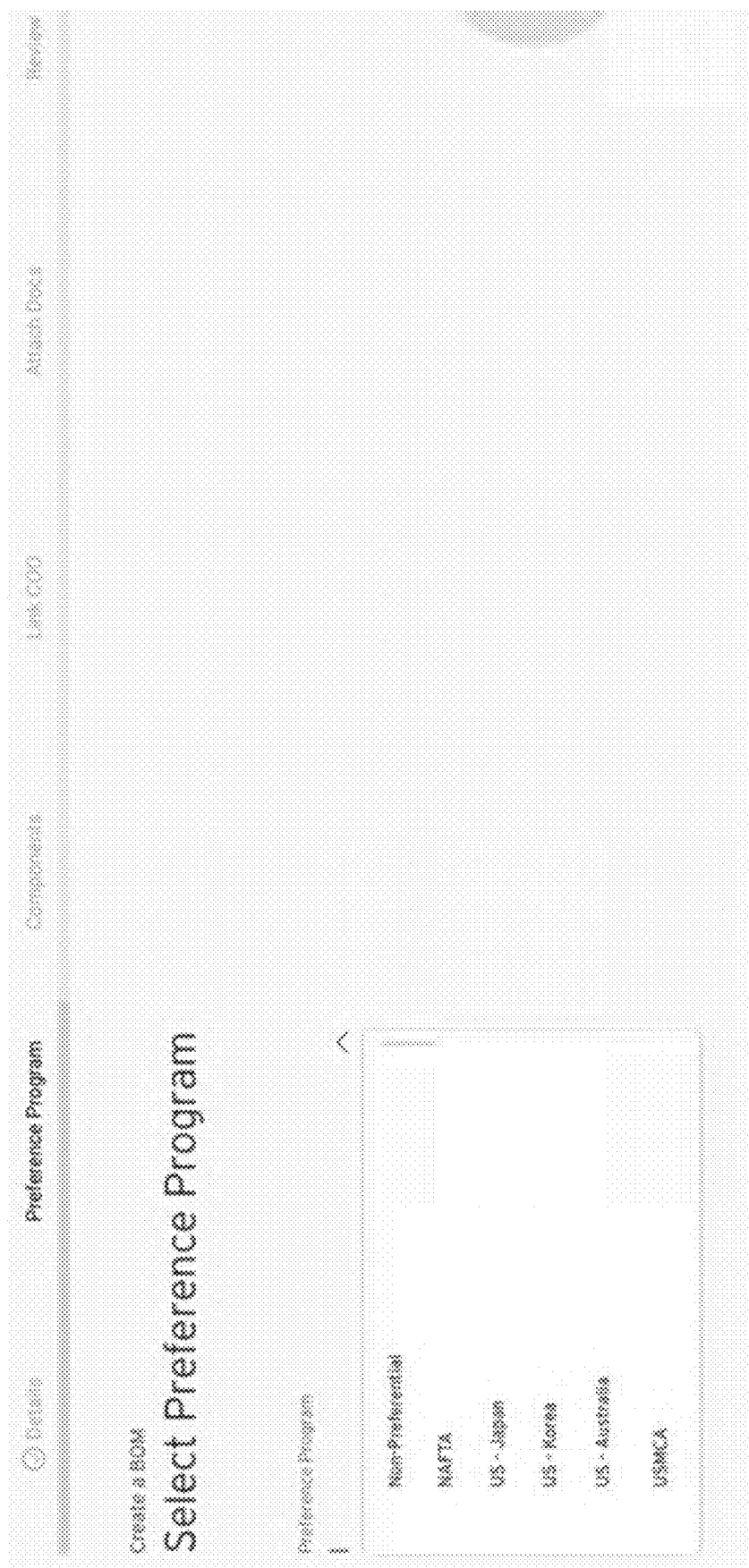
FIG. 12 is an example GUI screen for selecting a preference program, according to some embodiments.
Figure 13:
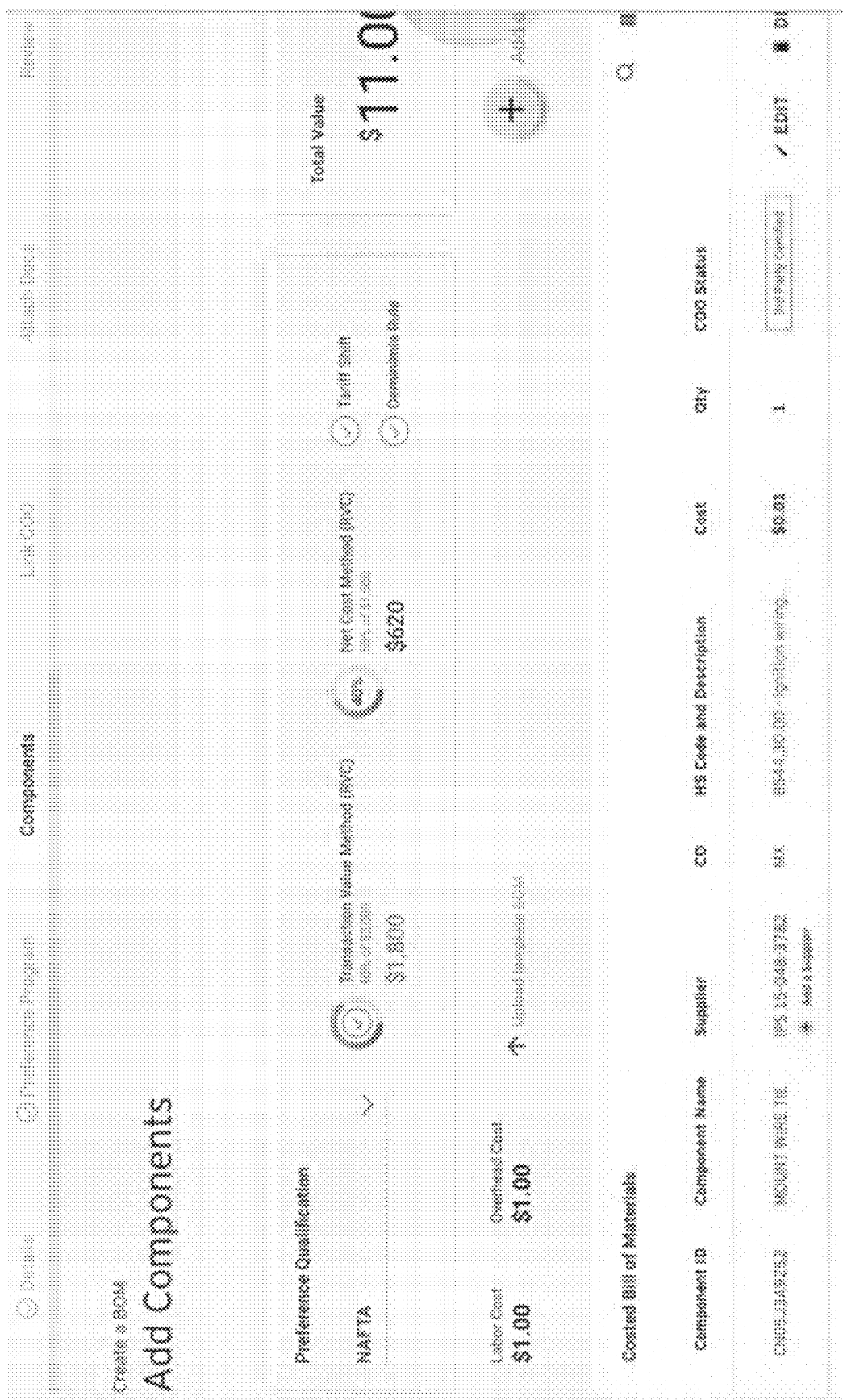
FIGS. 13-15 are example GUI screens for adding components to a BOM, according to some embodiments.
Figure 14:
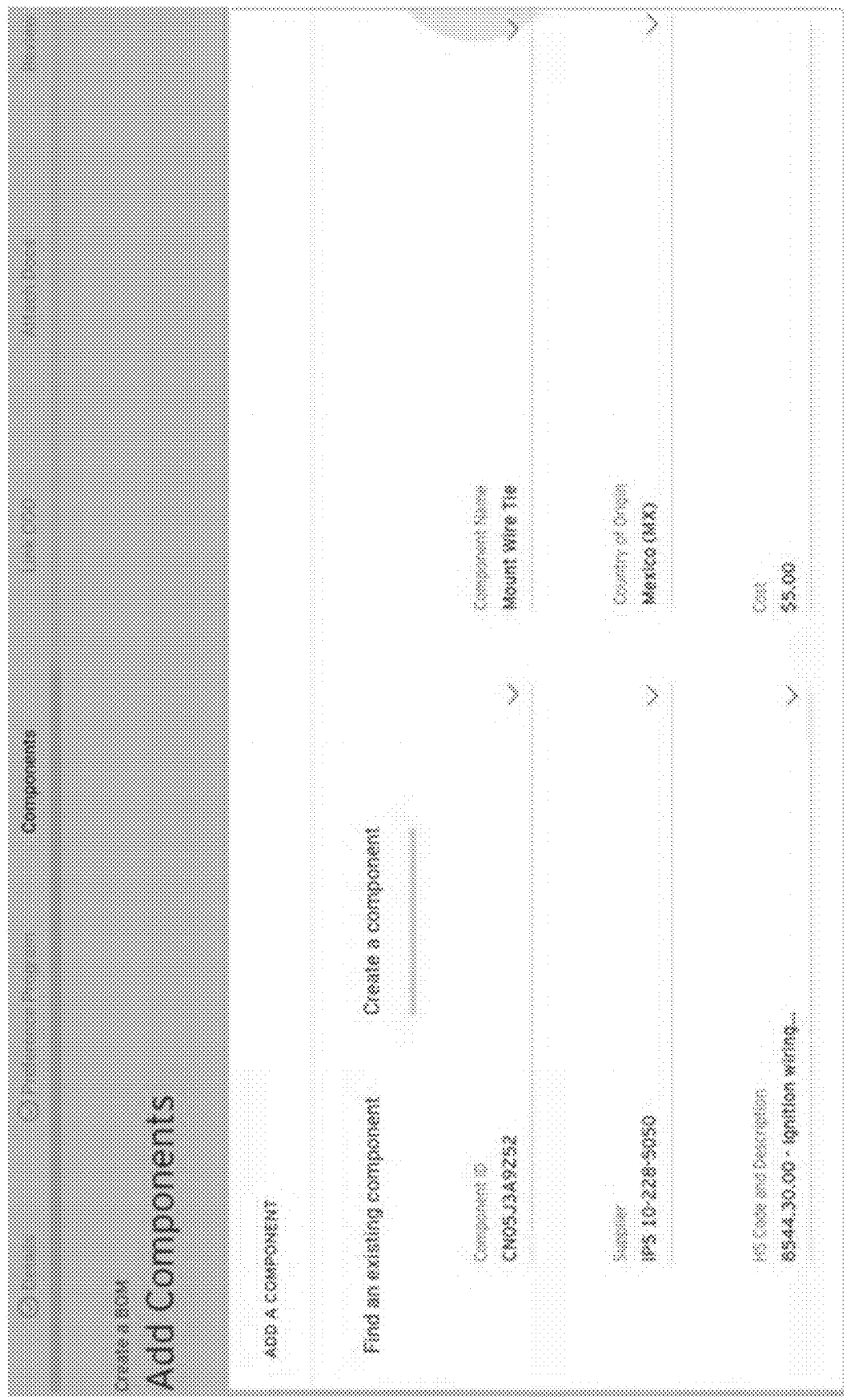
Figure 15:
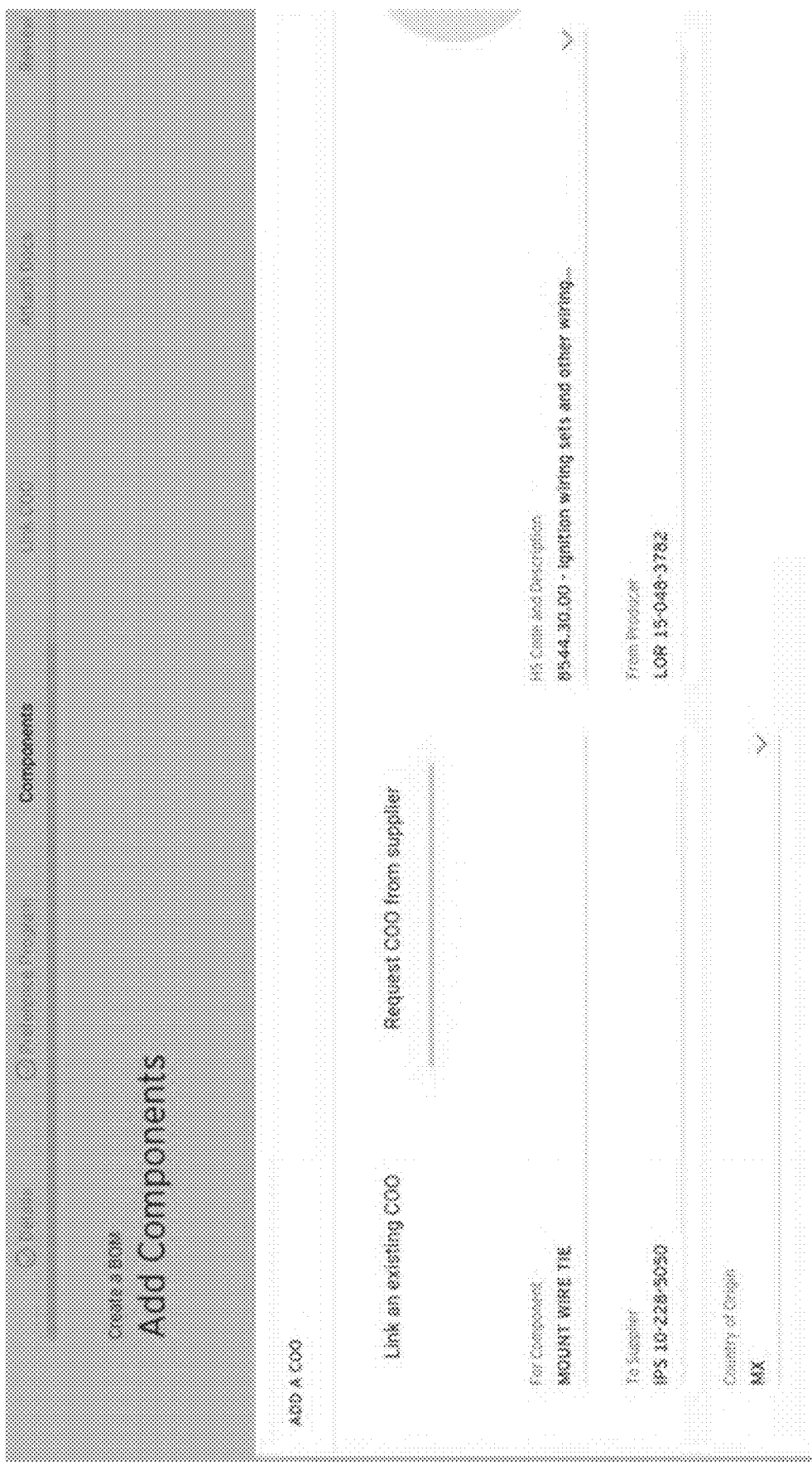
Figure 16:
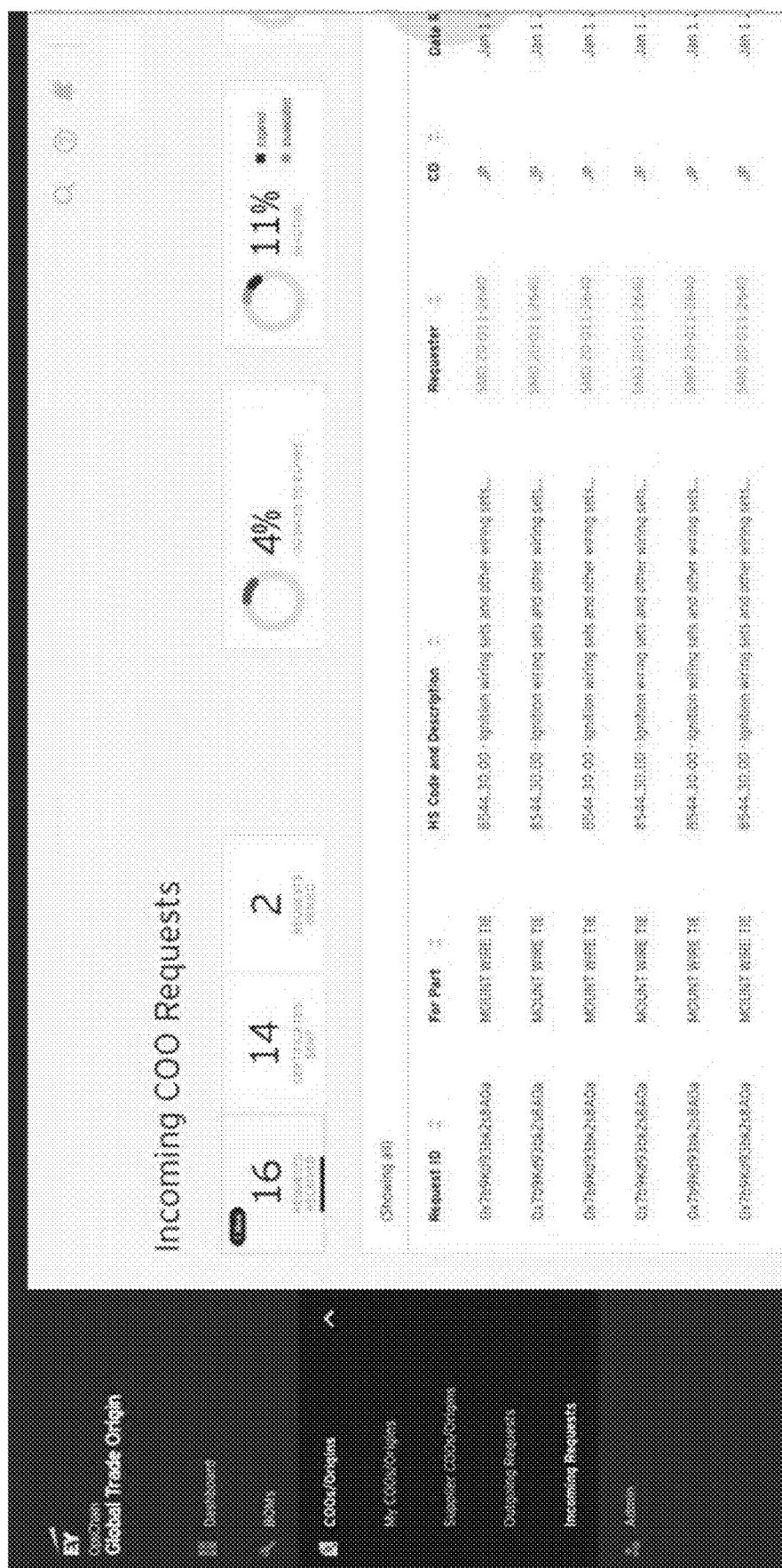
FIG. 16 is an example GUI screen showing incoming COO requests, according to some embodiments.
Figure 17:
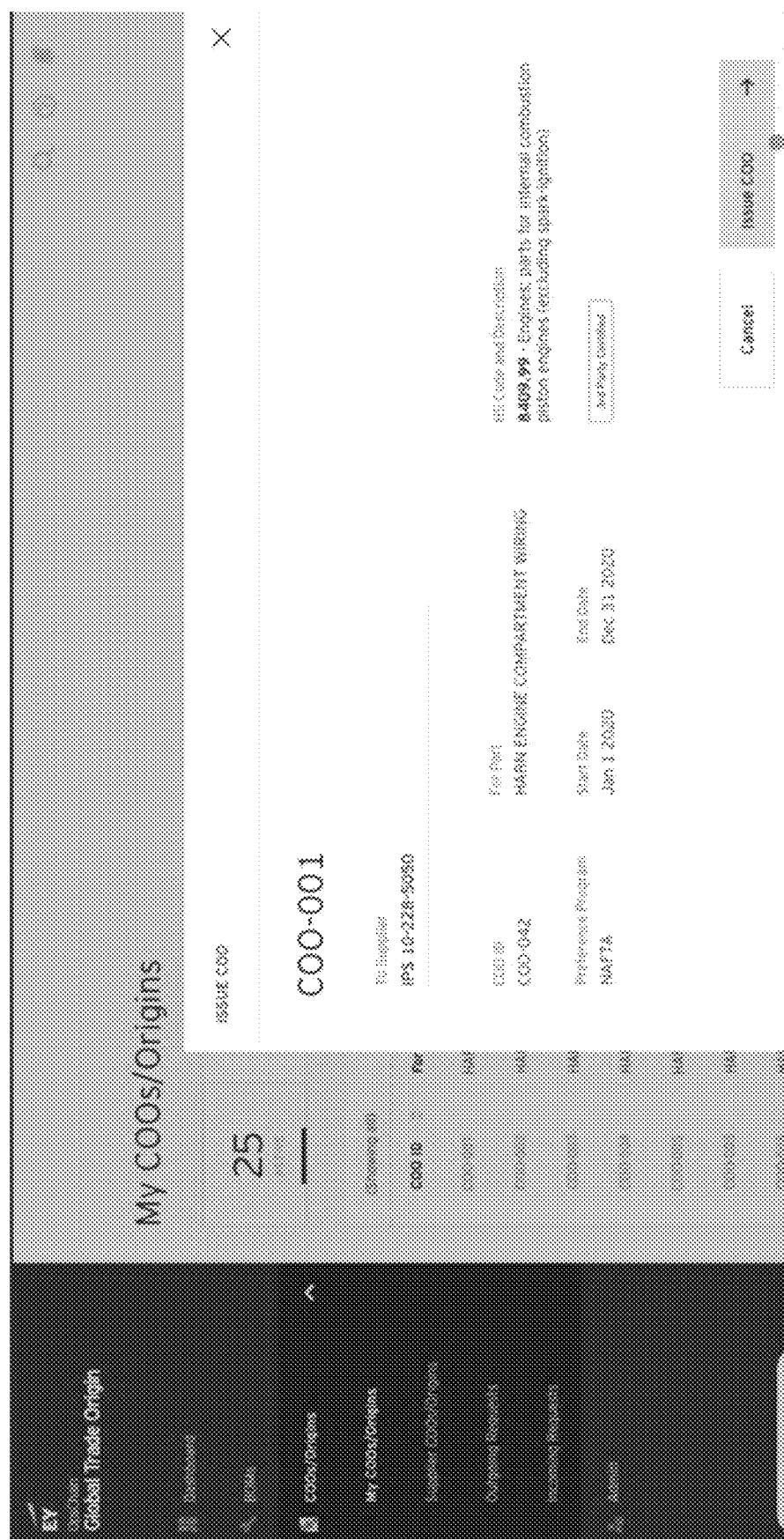
FIG. 17 is an example GUI screen showing an example COO, according to some embodiments.
Figure 18:
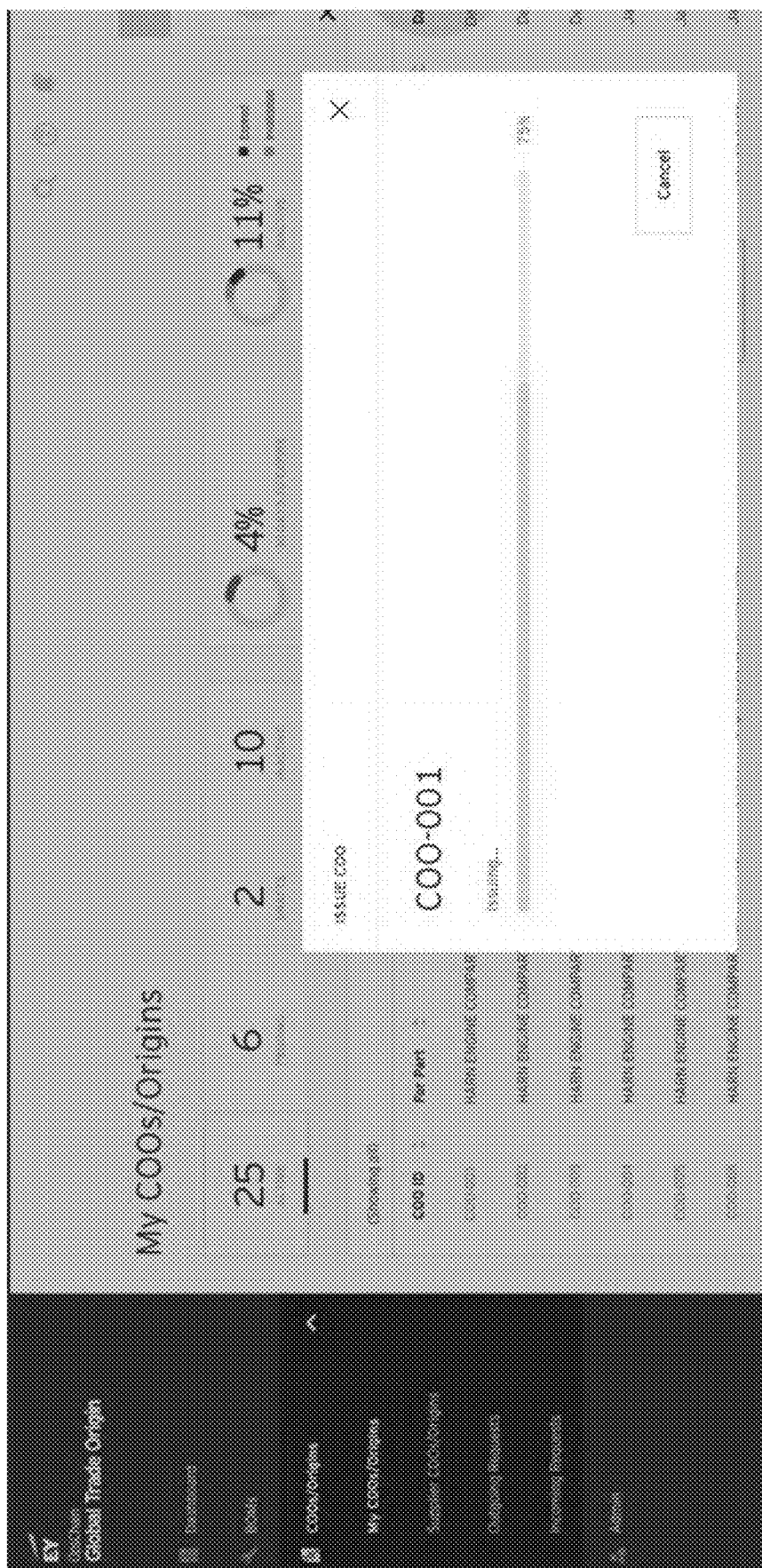
FIG. 18 is an example GUI screen showing issuance of a COO, according to some embodiments.
Figure 19:
FIG. 19 is an example GUI screen for reviewing BOM details, according to some embodiments.
Figure 20:
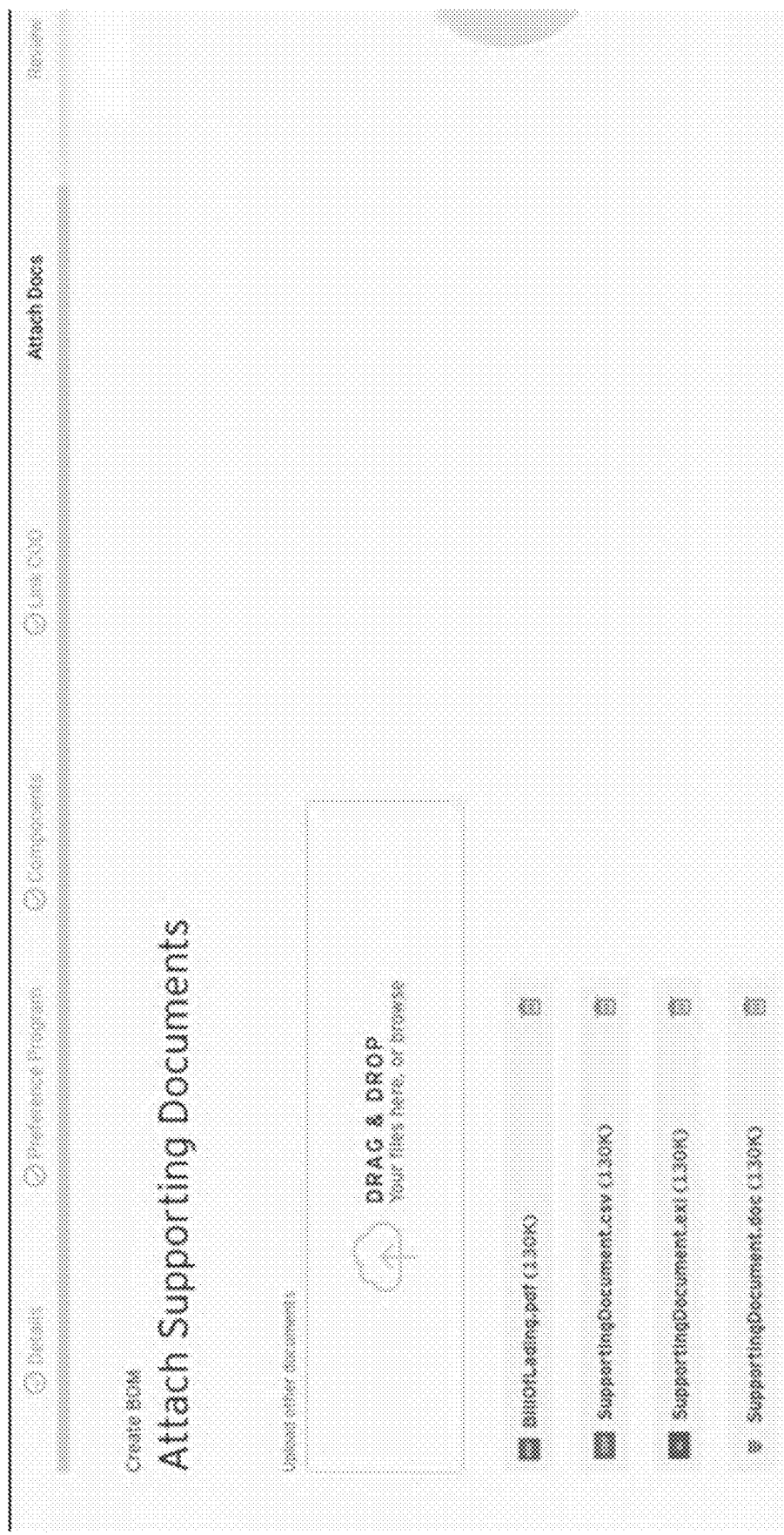
FIG. 20 is an example GUI screen for attaching supporting documents to a BOM, according to some embodiments.
Figure 21:
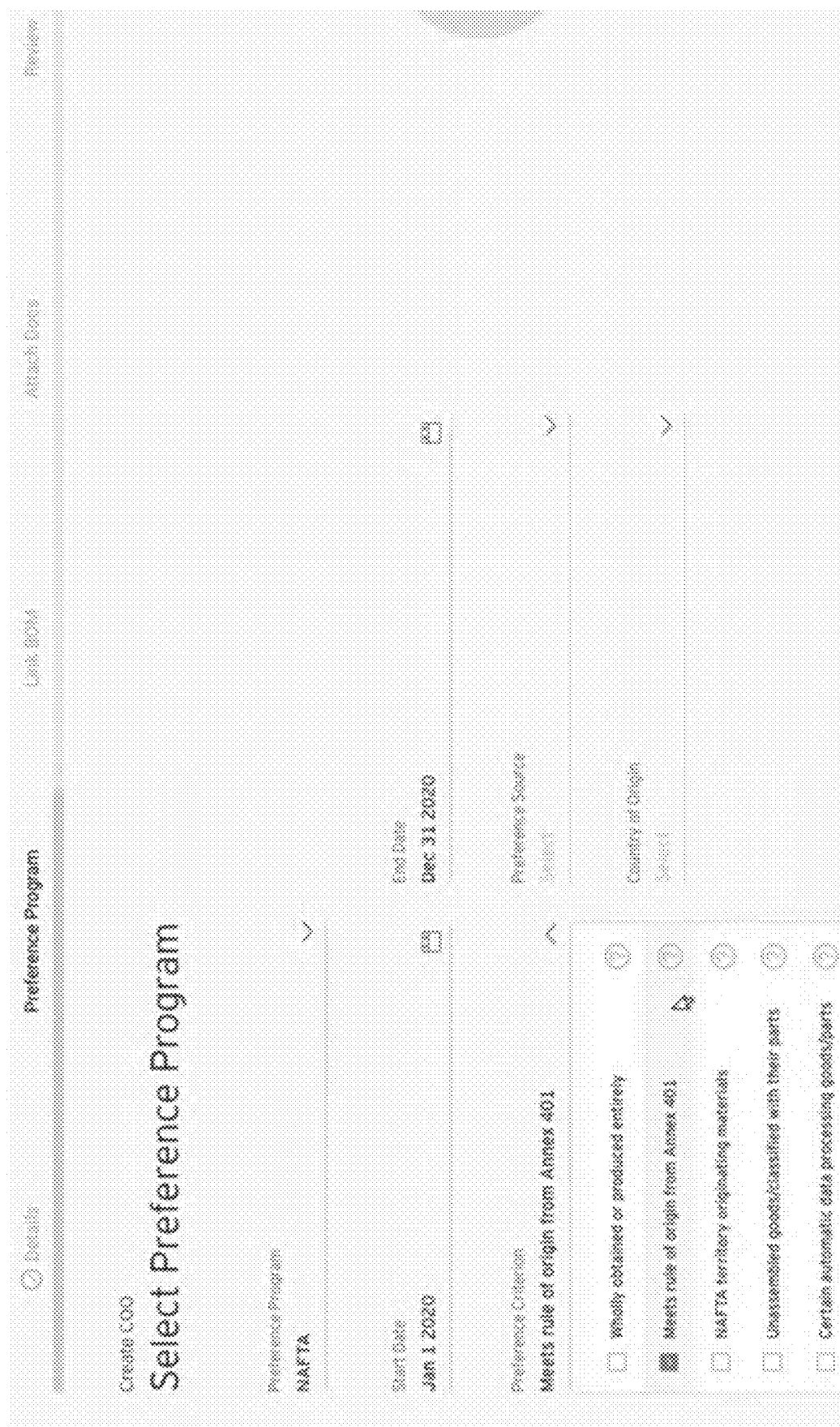
FIG. 21 is an example GUI screen showing selection of preference criterion, according to some embodiments.
Figure 22:
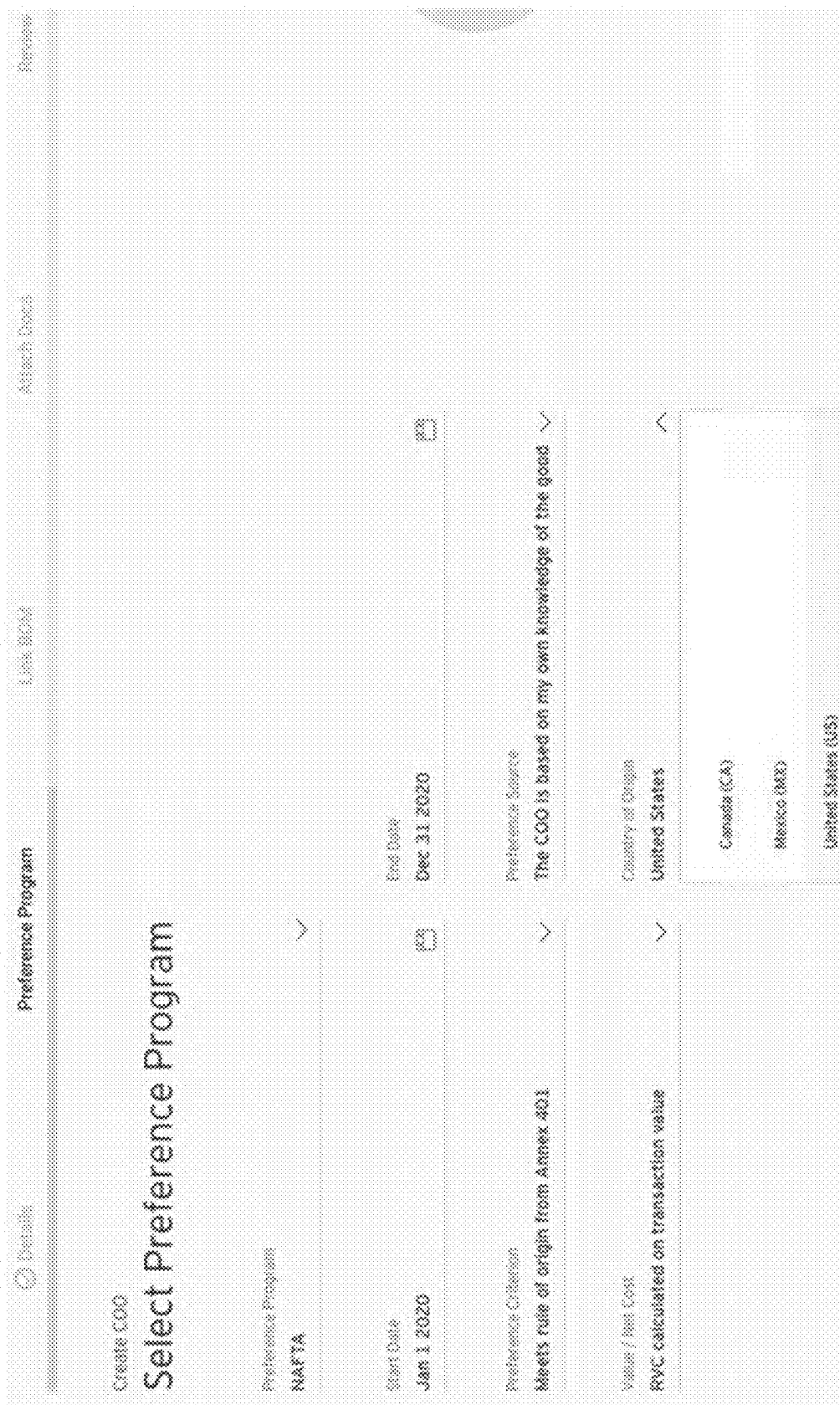
FIG. 22 is an example GUI screen showing selection of a country of origin, according to some embodiments.
Figure 23:
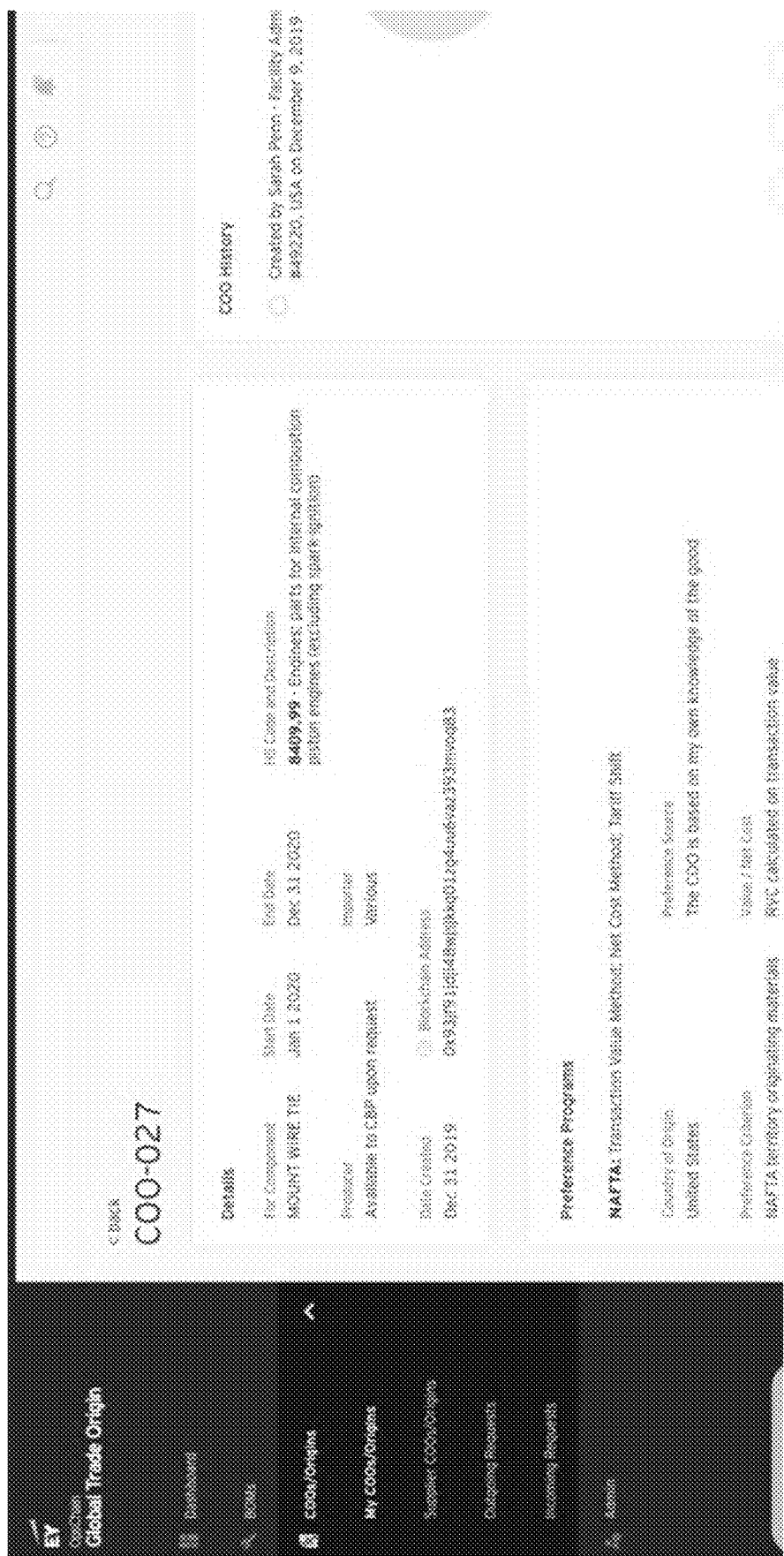
FIG. 23 is an example GUI screen showing a detailed view of a COO, according to some embodiments.

FIG. 10 is an example graphical user interface (GUI) screen showing bills of material, according to some embodiments. FIG. 11 is an example GUI screen for defining BOM details, according to some embodiments. FIG. 12 is an example GUI screen for selecting a preference program, according to some embodiments. FIGS. 13-15 are example GUI screens for adding components to a BOM, according to some embodiments. FIG. 16 is an example GUI screen showing incoming COO requests (e.g., received at a supplier), according to some embodiments. FIG. 17 is an example GUI screen showing an example COO, according to some embodiments. FIG. 18 is an example GUI screen showing issuance of a COO, according to some embodiments. FIG. 19 is an example GUI screen for reviewing BOM details (e.g., to complete the BOM and generate a new COO template), according to some embodiments. FIG. 20 is an example GUI screen for attaching supporting documents to a BOM, according to some embodiments. FIG. 21 is an example GUI screen showing selection of preference criterion, according to some embodiments. FIG. 22 is an example GUI screen showing selection of a country of origin, according to some embodiments. FIG. 23 is an example GUI screen showing a detailed view of a COO, according to some embodiments.

Figure 24:
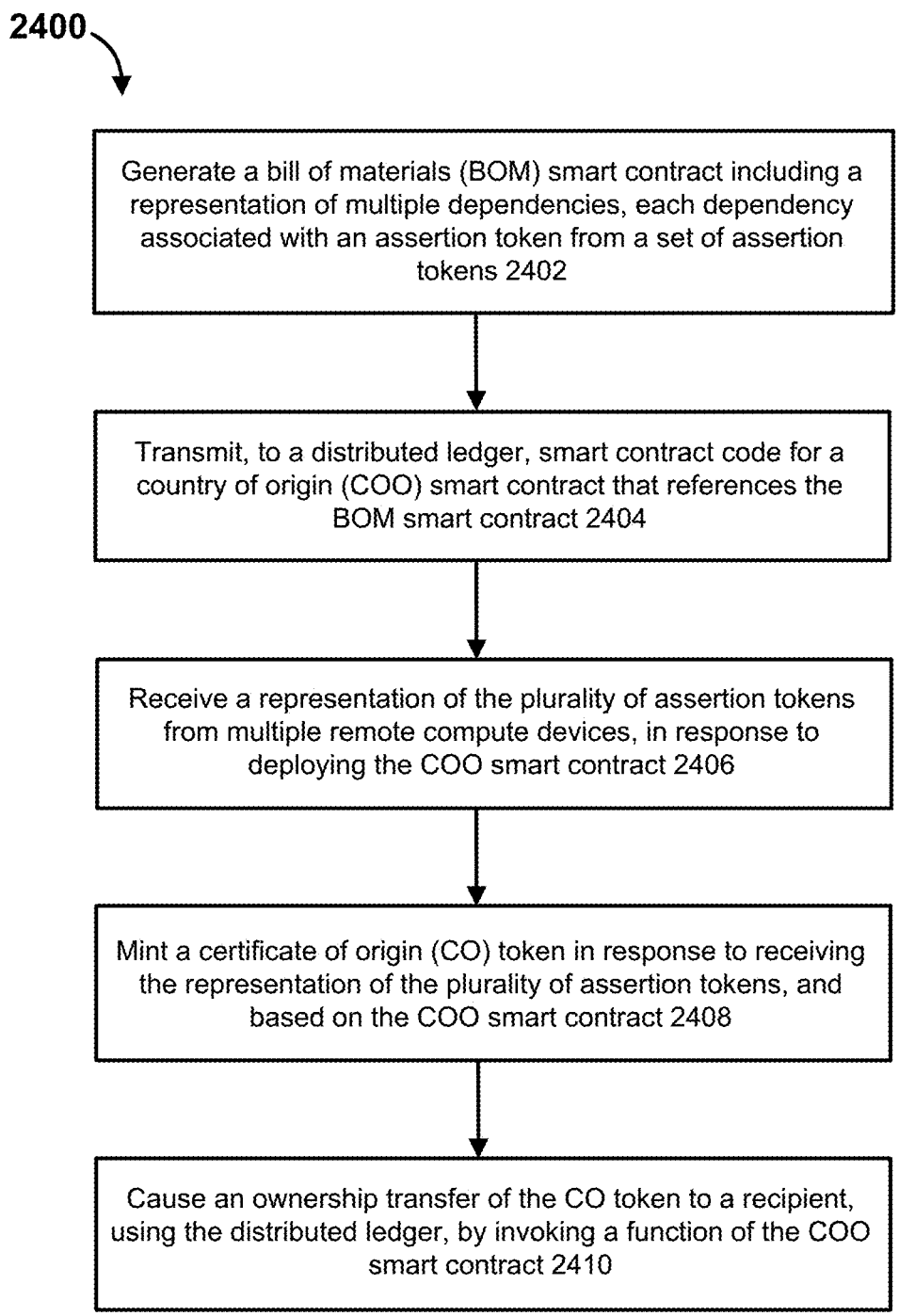
FIG. 24 is a flow diagram showing a first method for transferring ownership of a CO token, according to some embodiments.

FIG. 24 is a flow diagram showing a first method for transferring ownership of a CO token (e.g., a non-fungible token (NFT)), according to some embodiments. As shown in FIG. 24, the method 2400 includes generating, at 2402 and via a processor, a bill of materials (BOM) smart contract. The BOM smart contract includes a representation of multiple dependencies, each dependency from the multiple dependencies being associated with an assertion token from a set of assertion tokens. The set of assertion tokens can include at least one blanket token and/or at least one shipment assertion token.

At 2404, the method 2400 also includes transmitting, via the processor and to a distributed ledger, software/computer code ("smart contract code") that represents/implements a country of origin (COO) smart contract that references the BOM smart contract. The processor receives, at 2406, a representation of the plurality of assertion tokens from a plurality of remote compute devices, in response to deploying the COO smart contract. The representation of the plurality of assertion tokens has a size that is smaller than a size of the data of the plurality of assertion tokens. As such, a processing time associated with the representation of the plurality of assertion tokens is reduced, as compared with a processing time associated with the plurality of assertion tokens. Similarly, a computational cost associated with the representation of the plurality of assertion tokens is reduced, as compared with a computational cost associated with the plurality of assertion tokens.

At 2408, the processor mints a certificate of origin (CO) token in response to receiving the representation of the plurality of assertion tokens. Minting the CO token can include, for example, generating a transaction and transmitting the transaction to a smart contract to cause generation of the CO token. Minting the CO token can also include storing a representation of the CO token on the distributed ledger. Representation of the CO token on the distributed ledger facilitates access, by multiple remote compute devices, to the CO token without the need to transmit the contents of the CO token to each of the multiple remote compute devices, thereby reducing network traffic and computational overhead. At 2410, the processor causes an ownership transfer of the CO token to a recipient, using the distributed ledger, by invoking a function of the COO smart contract. Invoking the function of the COO smart contract can cause, for example, an ownership transfer transaction to be recorded to the distributed ledger, the ownership transfer transaction including a representation of a new owner and a representation of the good(s) owned by the new owner.

The method 2400 optionally also includes storing, in a memory operably coupled to the processor, a representation of an association between the BOM smart contract and the COO smart contract (not shown). Alternatively or in addition, the method 2400 can optionally also include validating the received representation of the plurality of assertion tokens, and the minting can further be performed in response to the validating (not shown). Alternatively or in addition, the method 2400 can optionally also include generating a zero-knowledge proof (ZKP) to validate the ownership transfer without revealing to third parties (1) an identity of a current owner of the CO token, (2) an identity of a previous owner of the CO token, or (3) content of the CO token.

In some embodiments, the COO smart contract is associated with a good, the plurality of remote compute devices includes a plurality of supplier compute devices, and the recipient compute device is a compute device of a customer of the good. The COO smart contract can include a template configured to provide information accessed during the minting of the CO token.

In some embodiments, the minting is performed further in response to determining that the received representation of the plurality of assertion tokens satisfies the plurality of dependencies. For example, the plurality of dependencies may include two or more of: an assertion of a country of origin, an assertion of one or more attributes of the good(s), an assertion of a labor content, an assertion that no forced labor was used in the production of the good(s), an assertion of an import procedure, an assertion of an export procedure, or an assertion referencing a regulatory requirement.

In some embodiments, the method 2400 also includes registering at least one dependency from the plurality of dependencies in a public registry that is subsequently audited, without revealing an identity of any party associated with the at least one dependency from the plurality of dependencies.

In some embodiments, the CO token remains on the distributed ledger once minted and throughout the method 2400, and it is the ownership of the CO token, rather than the CO token itself, that is transferred from an existing owner to a subsequent owner, for example by invoking one or more functions of the COO smart contract.

In some embodiments, the method 2400 also includes invalidating an admissibility claim and/or a claim for a duty benefit based on a flow of one or more tokenized assertions within the distributed ledger. Similarly, the method 2400 can include validating an admissibility claim and/or a claim for a duty benefit based on a flow of one or more tokenized assertions within the distributed ledger. Alternatively or in addition, a determination can be made as to whether one or more goods qualifies under a trade program and/or complies with one or more regulatory processes based on a flow of one or more tokenized assertions within the distributed ledger.

Figure 25:
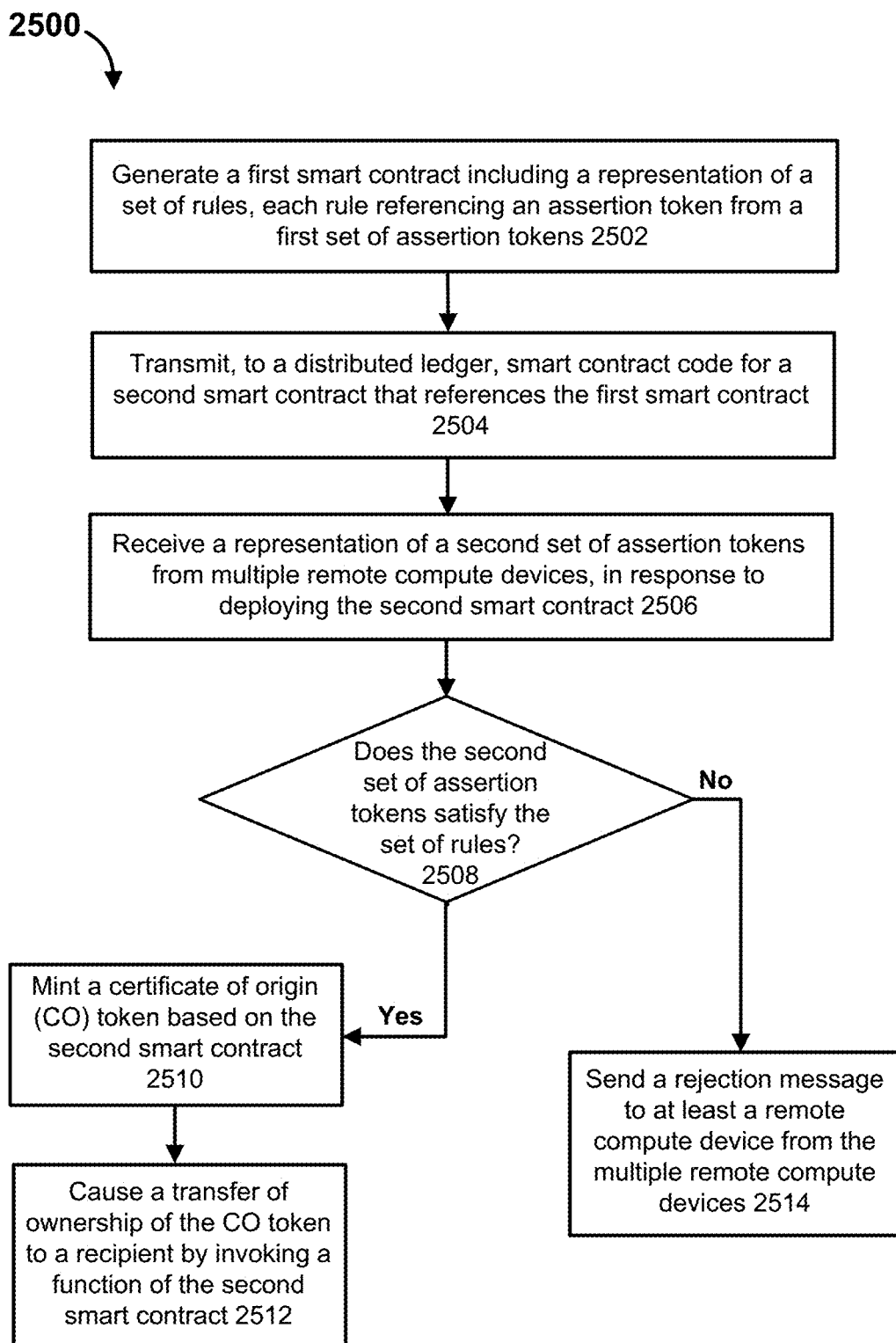
FIG. 25 is a flow diagram showing a second method for transferring ownership of a CO token, according to some embodiments.

FIG. 25 is a flow diagram showing a second method for transferring ownership of a CO token (e.g., a non-fungible token (NFT)), according to some embodiments. As shown in FIG. 25, the method 2500 includes generating, at 2502 and via a processor, a first smart contract including a representation of a set of rules. Each rule from the set of rules can reference an assertion token from a first set of assertion tokens. At 2054, the processor transmits, to a distributed ledger, smart contract code for a second smart contract that references the first smart contract. At 2506, the processor receives a representation of a second set of assertion tokens from multiple remote compute devices, in response to deploying the second smart contract. The second set of assertion tokens can include at least one blanket token, which may include a representation of a plurality of purchase orders. Alternatively or in addition, the second set of assertion tokens can include at least one shipment assertion token. At 2508, a determination is made as to whether the second plurality of assertion tokens satisfies the plurality of rules (or a subset thereof). If it is determined, at 2508, that the second plurality of assertion tokens satisfies the plurality of rules (or subset thereof), and in response to determining that the second plurality of assertion tokens satisfies the plurality of rules (or subset thereof), the processor mints a certificate of origin (CO) token based on the second smart contract, and causes a transfer of ownership of the CO token to a recipient by invoking a function of the second smart contract. If it is determined, at 2508, that the second plurality of assertion tokens does not satisfy the plurality of rules (or subset thereof), and in response to determining that the second plurality of assertion tokens does not satisfy at least one rule from the plurality of rules (or subset thereof), the processor sends a rejection message to at least one remote compute device from the plurality of remote compute devices. The method 2500 optionally also includes registering at least one rule from the plurality of rules in a public registry that is subsequently audited, without revealing an identity of any party associated with the at least one rule from the plurality of rules (not shown). Alternatively or in addition, the method 2500 can also include generating a zero-knowledge proof (ZKP) to validate the transfer of ownership without revealing to third parties (1) an identify of a current owner of the CO token, (2) an identity of a previous owner of the CO token, or (3) content of the CO token.

In some embodiments, the second smart contract is associated with a good, the plurality of remote compute devices includes a plurality of supplier compute devices, and the recipient compute device is a compute device of a customer of the good. The second smart contract can include a template that is configured to provide information accessed during the minting of the CO token.

Figure 26:
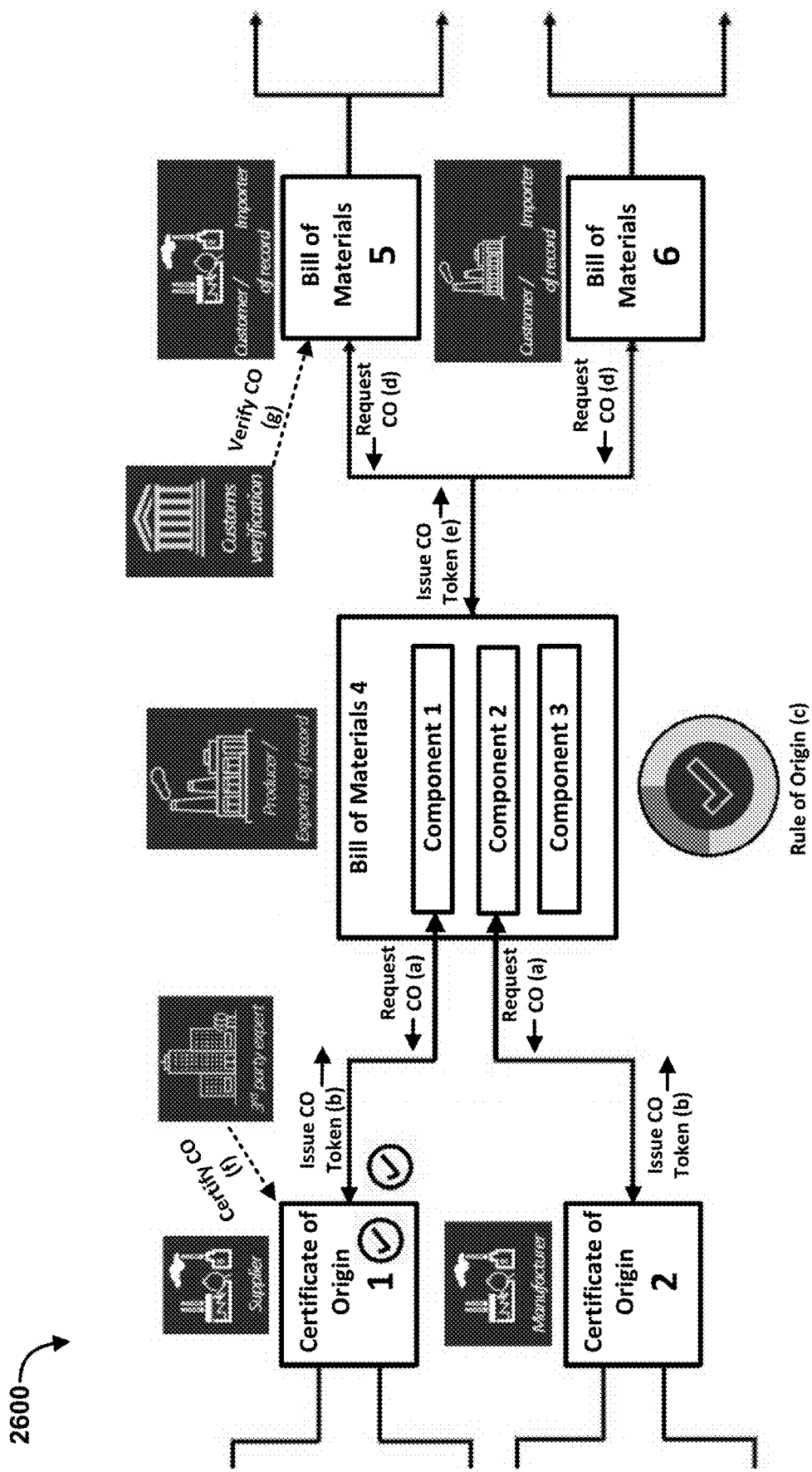
FIG. 26 is a diagram showing token transactions within a networked system including a supplier, a manufacturer, a producer, and customers, according to some embodiments.

FIG. 26 is a diagram showing token transactions within a networked system including a supplier, a manufacturer, a producer, and customers, according to some embodiments. At step (a), requests for certificates of origin are sent, from one or more compute devices of a producer, to each of a compute device of a supplier and a compute device of a manufacturer. In response to the requests, CO tokens are issued by the compute device of a supplier and the compute device of a manufacturer, at step (b). The CO tokens are written to the distributed ledger. At step (c), a rule of origin check is automatically performed, in response to receiving the CO token(s) and without human intervention, for example in which the one or more compute devices of the producer compares assertions of the CO tokens on the distributed ledger to a set of rules stored in memory of, or accessible by, the one or more compute devices. Assuming that the rule of origin check is successful (i.e., the assertions of the CO tokens satisfy the set of rules), the one or more compute devices of the producer can issue CO tokens at step (e), in response to requests for certificates of origin subsequently received at the one or more compute devices of the producer from compute devices of customers and/or importers of record, as shown at step (d). Optionally, requests to certify certificates of origin can be received from compute devices of third parties and processed by suppliers and/or manufacturers (i.e., via their associated compute devices), and requests to verify certificates of origin can be received from compute devices of customs agencies and processed by the customers and/or importers of record (i.e., via their associated compute devices), as shown in FIG. 26.

Intelligent tokens and associated systems of the present disclosure can be used for tracking the Country of Origin of goods within a supply chain, and for establishing both (i) a customs authority's admissibility requirements for the goods, and (ii) the application of preferential or non-preferential trade program, for the goods.

All combinations of the foregoing concepts and additional concepts discussed herewithin (provided such concepts are not mutually inconsistent) are contemplated as being part of the subject matter disclosed herein.

The drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
   generating, via a processor, a bill of materials (BOM) representation associated with a BOM indicating at least one good and including a representation of a plurality of dependencies to qualify the at least one good for at least one of a regulatory claim, a duty benefit claim or an admissibility claim, each dependency from the plurality of dependencies being associated with an assertion token from a plurality of assertion tokens that indicate the at least one good is qualified for at least one of the regulatory claim, the duty benefit claim or the admissibility claim;
   transmitting, via the processor and to a distributed ledger, smart contract code for a compliance declaration smart contract that references the BOM representation;
   receiving, via the processor, from a plurality of remote compute devices, and in response to deploying the compliance declaration smart contract, a representation of the plurality of assertion tokens;
   minting, via the processor, in response to receiving the representation of the plurality of assertion tokens and based on the compliance declaration smart contract, a compliance declaration token that indicates the plurality of dependencies are satisfied and the at least one good is qualified for at least one of the regulatory claim, the duty benefit claim or the admissibility claim; and
   causing, via the processor, an ownership transfer of the compliance declaration token to a recipient, using the distributed ledger, by invoking a function of the compliance declaration smart contract.

2. The method of claim 1, wherein the compliance declaration token is a non-fungible token (NFT).

3. The method of claim 1, wherein the compliance declaration smart contract is associated with the at least one good, the plurality of remote compute devices includes a plurality of supplier compute devices, and the recipient compute device is a compute device of a customer of the at least one good.

4. The method of claim 1, further comprising storing, in a memory operably coupled to the processor, a representation of an association between the BOM representation and the compliance declaration smart contract.

5. The method of claim 1, further comprising validating the received representation of the plurality of assertion tokens, the minting being further in response to the validating.

6. The method of claim 1, wherein the compliance declaration smart contract includes a template configured to provide information accessed during the minting of the compliance declaration token.

7. The method of claim 1, wherein the minting is performed further in response to determining that the received representation of the plurality of assertion tokens satisfies the plurality of dependencies.

8. The method of claim 1, further comprising registering at least one dependency from the plurality of dependencies in a public registry that is subsequently audited, without revealing an identity of any party associated with the at least one dependency from the plurality of dependencies.

9. The method of claim 1, further comprising generating a zero-knowledge proof (ZKP) to validate the ownership transfer without revealing to third parties (1) an identity of a current owner of the compliance declaration token, (2) an identity of a previous owner of the compliance declaration token, or (3) content of the compliance declaration token.

10. The method of claim 1, wherein the BOM representation is a smart contract.

11. The method of claim 1, wherein the BOM representation is a hash of an electronic version of the BOM.

12. The method of claim 1, wherein the BOM representation is a hash of a scanned image of the BOM.

13. The method of claim 1, wherein at least one assertion token from the plurality of assertion tokens is associated with a blanket period, the token is valid from a start date to an end date of the blanket period.

14. The method of claim 1, wherein at least one assertion token from the plurality of assertion token is associated with a specific shipment of goods referenced by that assertion token.

15. The method of claim 1, wherein at least one assertion token from the plurality of assertion tokens is associated with results of a certification or an audit by a third party.

16. A non-transitory processor-readable medium storing code representing processor-executable instructions to cause the one or more processors to:
generate, via a processor, a first smart contract including a representation of a plurality of rules to qualify for at least one of a regulatory claim, a duty benefit claim or an admissibility claim, each rule from the plurality of rules referencing an assertion token from a first plurality of assertion tokens that indicate qualifications for at least one of the regulatory claim, the duty benefit claim or admissibility claim are met;
transmit, via the processor and to a distributed ledger, smart contract code for a second smart contract that references the first smart contract;
receive, via the processor, from a plurality of remote compute devices, and in response to deploying the second smart contract, a representation of a second plurality of assertion tokens;
verify, via the processor, that the second plurality of assertion tokens satisfies the plurality of rules;
mint, via the processor, and based on the second smart contract, a compliance declaration token that indicates the plurality of rules are satisfied and the qualifications for at least one of the regulatory claim, the duty benefit claim or the admissibility claim are met; and
cause, via the processor, a transfer of ownership of the compliance declaration token to a recipient by invoking a function of the second smart contract.

17. The processor-readable medium of claim 16, wherein the compliance declaration token is a non-fungible token (NFT).

18. The processor-readable medium of claim 16, wherein the second smart contract is associated with a good, the plurality of remote compute devices includes a plurality of supplier compute devices, and the recipient compute device is a compute device of a customer of the good.

19. The processor-readable medium of claim 16, wherein the second smart contract includes a template configured to provide information accessed during the minting of the compliance declaration token.

20. The processor-readable medium of claim 16, further comprising registering at least one rule from the plurality of rules in a public registry that is subsequently audited, without revealing an identity of any party associated with the at least one rule from the plurality of rules.

21. The processor-readable medium of claim 16, wherein the code further comprising code to:
generate a zero-knowledge proof (ZKP) to validate the transfer of ownership without revealing to third parties (1) an identify of a current owner of the compliance declaration token, (2) an identity of a previous owner of the compliance declaration token, or (3) content of the compliance declaration token.

22. An apparatus, comprising:
a processor; and
a memory coupled to the processor, the memory storing code to cause the processor to:
generate a first smart contract including a representation of a plurality of rules to qualify for a regulatory claim, each rule from the plurality of rules referencing an assertion token from a first plurality of assertion tokens that indicate qualifications for the regulatory claim is met;
transmit, to a distributed ledger, smart contract code for a second smart contract that references the first smart contract;
receive from a plurality of remote compute devices, and in response to deploying the second smart contract, a representation of a second plurality of assertion tokens;
verify that the second plurality of assertion tokens satisfies the plurality of rules;
mint, based on the second smart contract, a compliance declaration token that indicates the plurality of rules are satisfied and the qualifications for at least one of the regulatory claim, the duty benefit claim or the admissibility claim are met; and
cause a transfer of ownership of the compliance declaration token to a recipient by invoking a function of the second smart contract.

23. The apparatus of claim 22, wherein the regulatory claim relates to at least one of (1) qualifying a good for a reduced duty or a reduced tariff, or (2) validating a tariff or a customs regulation.

24. The apparatus of claim 22, wherein the regulatory claim relates to an average labor cost for producing a good being at least a predefined value.

25. The apparatus of claim 22, wherein the regulatory claim relates to declaring no child labor or no forced labor was used in production of a good.

26. The apparatus of claim 22, wherein the regulatory claim relates to a declaration for regulated material.

\* \* \* \* \*

UNITED STATES PATENT AND TRADEMARK OFFICE
CERTIFICATE OF CORRECTION

| | | |
|---|---|---|
| PATENT NO. | : 11,783,333 B2 | |
| APPLICATION NO. | : 18/155329 | |
| DATED | : October 10, 2023 | |
| INVENTOR(S) | : John Stoddard Robotham et al. | |

It is certified that error appears in the above-identified patent and that said Letters Patent is hereby corrected as shown below:

In the Specification

In Column 30, Line 54 replace "ations-in-part, divisional s, and/or the like thereof. As such," with --ations-in-part, divisionals, and/or the like thereof. As such,--

Signed and Sealed this
Twenty-eighth Day of November, 2023

Katherine Kelly Vidal
*Director of the United States Patent and Trademark Office*